United States Patent
Kazmi et al.

(10) Patent No.: US 9,351,299 B2
(45) Date of Patent: May 24, 2016

(54) METHODS AND APPARATUS ENABLING INFORMATION EXCHANGE BETWEEN NETWORK NODES

(71) Applicant: Telefonaktiebolaget L M Ericsson (publ), Stockholm (SE)

(72) Inventors: Muhammad Kazmi, Bromma (SE); Olav Queseth, Solna (SE); Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/379,357

(22) PCT Filed: Mar. 7, 2013

(86) PCT No.: PCT/SE2013/050203
§ 371 (c)(1),
(2) Date: Aug. 18, 2014

(87) PCT Pub. No.: WO2013/133758
PCT Pub. Date: Sep. 12, 2013

(65) Prior Publication Data
US 2015/0011233 A1    Jan. 8, 2015

Related U.S. Application Data

(60) Provisional application No. 61/608,842, filed on Mar. 9, 2012, provisional application No. 61/608,890, filed on Mar. 9, 2012.

(51) Int. Cl.
H04W 72/04 (2009.01)
H04W 16/14 (2009.01)
H04L 27/26 (2006.01)

(52) U.S. Cl.
CPC ......... *H04W 72/044* (2013.01); *H04L 27/2605* (2013.01); *H04W 16/14* (2013.01)

(58) Field of Classification Search
None
See application file for complete search history.

(56) References Cited

U.S. PATENT DOCUMENTS

| 7,151,795 B1 | 12/2006 | Goldburg et al. |
| 2007/0253466 A1* | 11/2007 | Jones ............... H04W 16/14 |
| | | 375/131 |

(Continued)

FOREIGN PATENT DOCUMENTS

| EP | 1 494 490 A1 | 1/2005 | |
| EP | 1494490 * | 1/2005 | ............... H04Q 7/36 |

(Continued)

OTHER PUBLICATIONS

International Search Report for International Application No. PCT/SE2013/050203 mailed Jun. 6, 2013, 4 pages.

(Continued)

*Primary Examiner* — Leon-Viet Nguyen
(74) *Attorney, Agent, or Firm* — Myers Bigel & Sibley, P.A.

(57) ABSTRACT

A method that may be performed by a first, second and third node for handling information related to a guard band used or required in a radio spectrum used by the second node. The first, second and third nodes are comprised in a wireless communications network. The method in the first node comprises obtaining information from the second node. The information is related to the guard band used by the second node. The method further comprises adapting one or more procedures related to the radio operation within the wireless communications network, based on the obtained guard band information. The method in the second node comprises sending information related to the guard band to the first node. The method in the third node comprises requesting the first node to obtain information related to the guard band from the second node.

28 Claims, 13 Drawing Sheets

(56) References Cited

U.S. PATENT DOCUMENTS

| | | | |
|---|---|---|---|
| 2008/0070586 A1 | | 3/2008 | Kermoal |
| 2011/0205979 A1* | | 8/2011 | Silk .................... H04W 72/048 |
| | | | 370/329 |
| 2012/0270537 A1* | | 10/2012 | Weng .................... H04W 48/16 |
| | | | 455/424 |
| 2015/0009945 A1* | | 1/2015 | Shattil .................. H04W 12/04 |
| | | | 370/329 |

FOREIGN PATENT DOCUMENTS

| | | |
|---|---|---|
| WO | WO 2008/035171 A2 | 3/2008 |
| WO | WO 2011/061164 A2 | 5/2011 |

OTHER PUBLICATIONS

Written Opinion of the International Searching Authority for International Application No. PCT/SE2013/050203 mailed Jun. 6, 2013, 6 pages.

International Search Report for International Application No. PCT/SE2013/050210 mailed Jun. 6, 2013, 4 pages.

Written Opinion of the International Searching Authority for International Application No. PCT/SE2013/050210 mailed Jun. 6, 2013, 6 pages.

"Spectra and bandwidth of emissions" Recommendation ITU-R SM.328-11 (Question ITU-R 222/1) May 2006, 91 pages. Retrieved from internet: https://www.itu.int/rec/R-REC-SM.328-11-200605-I/en.

* cited by examiner

Table 1 E-UTRA frequency bands [TS 36.104]

| E-UTRA Operating Band | Uplink (UL) operating band BS receive UE transmit $F_{UL\_low} - F_{UL\_high}$ | Downlink (DL) operating band BS transmit UE receive $F_{DL\_low} - F_{DL\_high}$ | Duplex Mode |
|---|---|---|---|
| 1 | 1920 MHz – 1980 MHz | 2110 MHz – 2170 MHz | FDD |
| 2 | 1850 MHz – 1910 MHz | 1930 MHz – 1990 MHz | FDD |
| 3 | 1710 MHz – 1785 MHz | 1805 MHz – 1880 MHz | FDD |
| 4 | 1710 MHz – 1755 MHz | 2110 MHz – 2155 MHz | FDD |
| 5 | 824 MHz – 849 MHz | 869 MHz – 894 MHz | FDD |
| 6[1] | 830 MHz – 840 MHz | 875 MHz – 885 MHz | FDD |
| 7 | 2500 MHz – 2570 MHz | 2620 MHz – 2690 MHz | FDD |
| 8 | 880 MHz – 915 MHz | 925 MHz – 960 MHz | FDD |
| 9 | 1749.9 MHz – 1784.9 MHz | 1844.9 MHz – 1879.9 MHz | FDD |
| 10 | 1710 MHz – 1770 MHz | 2110 MHz – 2170 MHz | FDD |
| 11 | 1427.9 MHz – 1447.9 MHz | 1475.9 MHz – 1495.9 MHz | FDD |
| 12 | 699 MHz – 716 MHz | 729 MHz – 746 MHz | FDD |
| 13 | 777 MHz – 787 MHz | 746 MHz – 756 MHz | FDD |
| 14 | 788 MHz – 798 MHz | 758 MHz – 768 MHz | FDD |
| 15 | Reserved | Reserved | FDD |
| 16 | Reserved | Reserved | FDD |
| 17 | 704 MHz – 716 MHz | 734 MHz – 746 MHz | FDD |
| 18 | 815 MHz – 830 MHz | 860 MHz – 875 MHz | FDD |
| 19 | 830 MHz – 845 MHz | 875 MHz – 890 MHz | FDD |
| 20 | 832 MHz – 862 MHz | 791 MHz – 821 MHz | |
| 21 | 1447.9 MHz – 1462.9 MHz | 1495.9 MHz – 1510.9 MHz | FDD |
| 22 | 3410 MHz – 3490 MHz | 3510 MHz – 3590 MHz | FDD |
| 23 | 2000 MHz – 2020 MHz | 2180 MHz – 2200 MHz | FDD |
| 24 | 1626.5 MHz – 1660.5 MHz | 1525 MHz – 1559 MHz | FDD |
| 25 | 1850 MHz – 1915 MHz | 1930 MHz – 1995 MHz | FDD |
| ... | | | |
| 33 | 1900 MHz – 1920 MHz | 1900 MHz – 1920 MHz | TDD |
| 34 | 2010 MHz – 2025 MHz | 2010 MHz – 2025 MHz | TDD |
| 35 | 1850 MHz – 1910 MHz | 1850 MHz – 1910 MHz | TDD |
| 36 | 1930 MHz – 1990 MHz | 1930 MHz – 1990 MHz | TDD |
| 37 | 1910 MHz – 1930 MHz | 1910 MHz – 1930 MHz | TDD |
| 38 | 2570 MHz – 2620 MHz | 2570 MHz – 2620 MHz | TDD |
| 39 | 1880 MHz – 1920 MHz | 1880 MHz – 1920 MHz | TDD |
| 40 | 2300 MHz – 2400 MHz | 2300 MHz – 2400 MHz | TDD |
| 41 | 2496 MHz – 2690 MHz | 2496 MHz – 2690 MHz | TDD |
| 42 | 3400 MHz – 3600 MHz | 3400 MHz – 3600 MHz | TDD |
| 43 | 3600 MHz – 3800 MHz | 3600 MHz – 3800 MHz | TDD |

Note 1: Band 6 is not applicable.

*Figure 2* (Prior Art)

METHODS AND APPARATUS ENABLING INFORMATION EXCHANGE BETWEEN NETWORK NODES

CROSS REFERENCE TO RELATED APPLICATION

This application is a 35 U.S.C. §371 national stage application of PCT International Application No. PCT/SE2013/050203, filed on 7 Mar. 2013, which itself claims the benefit of both U.S. provisional Patent Application No. 61/608,842, filed 9 Mar. 2012, and U.S. provisional Patent Application No. 61/608,890, filed 9 Mar. 2012, the disclosures and contents of which are incorporated by reference herein in their entirety. The above-referenced PCT International Application was published in the English language as International Publication No. WO 2013/133758 A1 on 12 Sep. 2013.

TECHNICAL FIELD

Embodiments herein relate to a first node, a second node and a third node, and methods therein. In particular, embodiments herein relate to handling information related to a guard band used or required in a radio spectrum, in a wireless communications network.

BACKGROUND

Communication devices such as wireless devices are also known as e.g. User Equipments (UE), mobile terminals, wireless terminals and/or mobile stations. Wireless devices are enabled to communicate wirelessly in a wireless communications system or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications system.

Wireless devices may further be referred to as mobile telephones, cellular telephones, or laptops with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as wireless device or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the area of radio coverage provided by the base station at a base station site. One base station, situated on the base station site, may serve one or several cells, and may have co-located or distributed antennas. Further, each base station may support one or several communication technologies. The base stations communicate over the air interface operating on radio frequencies with the wireless devices within range of the base stations. Some base stations may be multi-standard radio (MSR) base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. The 3GPP has undertaken to evolve further the UTRAN and GSM based radio access network technologies.

According to 3GPP GSM EDGE Radio Access Network (GERAN), a wireless device has a multi-slot class, which determines the maximum transfer rate in the uplink and downlink direction. EDGE is an abbreviation for Enhanced Data rates for GSM Evolution. In the end of 4008 the first release, Release 8, of the 3GPP Long Term Evolution (LTE) standard was finalized and later releases have also been finalized.

In the context of this disclosure, the expression Downlink (DL) is used for the transmission path from the base station to the mobile station. The expression Uplink (UL) is used for the transmission path in the opposite direction i.e. from the mobile station to the base station.

In a wireless communications network, radio transmissions on one frequency create co-channel interference but may also cause interference or noise on another frequency, where the other frequency may be an adjacent or non-adjacent channel, in the same or other frequency band. Interference sources may be categorized as:

(1) Co-channel (interferer, a.k.a. aggressor, and victim use the same frequencies); and/or
(2) Inter-channel Interference (aggressor and victim use different frequencies), such as,
  Out-of-band emissions,
  Spurious emissions,
  Unwanted emissions,
  Adjacent channel interference & receiver selectivity,
  Spurious responses,
  Intermodulation, and/or
  Receiver blocking and receiver overload.

The term inter-channel interference reflects a series of potential interference issues that may occur throughout a communications system's service area on one channel due to radio communications activity on another channel. Inter-channel interference is a function of the performance of both transmitters and receivers.

Out-of-band emissions. Transmitter emissions that fall outside of the transmitter's intended channel bandwidth are known as out-of-band emissions (OOBE) or, equivalently, as sideband noise. This noise splatters into the adjacent channels and into other bands, generally decreasing in strength with the frequency offset from the transmitter frequency.

Spurious emissions. Emission on a frequency or frequencies which are outside the transmitter's intended channel bandwidth are known as spurious emissions, and the level of spurious emissions may be reduced without affecting the corresponding transmission of information.

Unwanted emissions. Unwanted emissions consist of spurious emissions and out-of-band emissions.

Adjacent channel interference and receiver selectivity. Desensitization, or ACS (Adjacent Channel Selectivity), is a measure of a receiver's ability to receive a wanted signal at its assigned channel frequency in the presence of an adjacent channel interfering signal at a given frequency offset from the centre frequency of the assigned channel, without the interfering signal causing a degradation of the receiver performance beyond a specified limit.

Adjacent Channel Leakage Ratio is a measure of the power which leaks into certain specific nearby Radio Frequency (RF) channels as a result of transmitting in a given channel. It provides an estimate of how much a neighbouring radio receiver will be affected by the Out Of Band (OOB) emissions from a transmitter. It is defined as the ratio of the filtered mean power in a set bandwidth within the wanted channel to the filtered mean power in an adjacent channel.

Spurious responses. It is common for transmitters to have elevated power levels at a small number of discrete frequencies other than the intended transmitter frequency. Likewise, receivers exhibit somewhat elevated sensitivity at a small number of discrete frequencies outside the intended receive frequency bandwidth.

Intermodulation. Receiver intermodulation (IM) is the result of mixing two or more over-the-air signals within a radio's receiver circuitry such that the mix products fall within the Intermediate Frequency (IF) bandwidth of the receiver and add to its thermal noise floor, thus reducing the sensitivity of the receiver. IM is not due to the transmitter's spectrum output but to non-linearity within the receiver itself.

Receiver blocking. Describes a situation when the receiver front end can be overloaded by a single high level unwanted signal, residing outside of the desired channel, or multiple high level unwanted signals.

Transmit-receive scenarios are common interference scenarios, especially in unpaired spectrum, but also with paired spectrum with multiple systems in the same area. Some example interference scenarios caused by DL radio transmissions are illustrated in FIG. 1. There are also interference scenarios cause by UL radio transmission or a combination of both DL and UL transmissions.

FIG. 1 illustrates examples of scenarios of adjacent or other-channel interference from DL (downlink) transmissions on frequency f1: (a) to a device communicating with another system (e.g., a satellite) on frequency f2; (b) to a device receiving DL transmissions from a radio node on frequency f3; (c) to a radio node receiving UL (uplink) transmissions from a device on frequency f4, where the radio node may belong to own system (e.g., with FDD or frequency division duplex where DL and UL transmissions are on different frequencies) or other system; and (d) to a device communicating with another device using frequency f5.

The amount of inter-channel interference and the caused performance degradation of a victim system may be significant. Managing the inter-channel interference may thus be important for spectrum management, network planning, network deployment, and/or network operation tasks. To provide good/improved co-existence performance of multiple systems and control an amount of allowed emitted power and unwanted emissions as well as a receiver ACS capability, the 3GPP (3rd Generation Partnership Project) standard specifies RF transmitter and receiver requirements, e.g., spectral masks, ACLR (Adjacent Channel Leakage Ratio), ACS, etc., which are defined for both user equipment and radio nodes.

Radio Requirements

The UEs (i.e., user equipment nodes or wireless devices or terminals) and base stations may be required to fulfill a specified set of RF transmitter and RF receiver requirements to provide that the wireless devices limit interference and are able to handle a certain level of interference respectively.

More specifically, out of band (OOB) and spurious emission requirements are to be met as part of RF transmitter requirements. An objective of OOB and spurious emission requirements is to reduce/limit the interference caused by the transmitters, e.g., User Equipment (UE) and/or Base Station (BS) transmitters, outside their respective operating bandwidths to the adjacent carriers or bands. In fact, wireless communication standards such as Global System for Mobile Communications (GSM), Universal Mobile Telecommunications System (UMTS) Terrestrial Radio Access Network (UTRAN), Evolved UTRAN (E-UTRAN), Wireless Local Area Network (WLAN) etc., clearly specify the OOB and spurious emission requirements to reduce, limit, and/or minimize unwanted emissions. These requirements may be primarily approved and set by the national and international regulatory bodies, such as, ITU-R (International Telecommunications Union—Radiocommunications Sector), FCC (Federal Communications Commission), ARIB (Association of Radio Industries And Businesses), ETSI (European Telecommunications Standards Institute), etc.

Unwanted emission requirements, which may be specified by the standardization bodies and eventually enforced by the regulators in different countries and regions for both UE and the base stations may include:

(1) Adjacent Channel Leakage Ratio (ACLR);
(2) Spectrum Emission Mask (SEM);
(3) Spurious emissions; and/or
(4) In-band unwanted emissions.

Specific definitions and/or specified levels of these requirements may vary from one system to another. Typically, these requirements provide that emission levels outside an operating bandwidth or band in some cases remain several tens of decibels (dB) lower compared to the wanted signal in the operating bandwidth. Although OOB and spurious emission level tend to decay dramatically further away from an operating band, they may not be completely eliminated, at least in the adjacent carrier frequencies.

Significant RF receiver requirements, which are typically specified by the standards bodies and in some cases enforced by the regulators in different countries and regions for both UE and the base stations include:

(1) Receiver sensitivity;
(2) Adjacent Channel Selectively (ACS);
(3) In-channel selectivity;
(4) Spurious emissions; and/or
(5) Blocking: in-band, out-of-band, narrow-band, etc.

Operating Bands in 3GPP

The currently specified operation bands for Evolved Universal Terrestrial Radio Access (E-UTRA) are shown in Table 1 of FIG. 2. The embodiments described herein, however, are not limited to E-UTRA bands, 3GPP bands, or even licensed bands in general.

Spectrum Management and Guard Bands

A significant step in the development of interference avoidance mechanisms is the creation of a spectrum database. It may also be important to supplement this allocation and assignment data with information regarding the actual use of the airwaves. Indeed, a more complete database may include additional information such as temporal duty cycles, and active and inactive time periods. The analysis of the inventory information along with any data on the actual use of spectrum may take into account the purpose for which a spectrum band in question has been originally allocated. For example, in some bands, it may be appropriate to look at average spectrum utilization over a given period of time or over a certain geographic area. For other bands, utilization could be based on peak usage levels, especially during times of emergency.

Configuring guard bands is one of the basic inter-channel interference, mainly adjacent channel interference, avoidance techniques. The part of the spectrum constituting a guard band is either unused or is partially used by the wireless device. The latter is also known as restricted operation or guard band comprising the restricted use of radio resources. More specifically the partial or limited use may mean, for example, that the transmitter is allowed to transmit at lower power level, e.g. up to 0 dBm in guard band, whereas up to 43 dBm may be transmitted in normal (non-guard band) portions of the spectrum.

A guard band is an allocation of spectrum used to separate adjacent transmit and receive bands within a given service or to separate bands of different services for the purpose of protecting operations within the separated bands from interference. Guard bands allow sideband noise and filter responses to roll off to acceptable levels before entering other bands. A guard band may be helpful, for example, to account for practical limits of filters used to prevent strong off-channel signals or emissions from entering receivers while enabling reducing out-of-channel signals or emissions to levels sufficient to protect the receiver. The guard band spectrum is typically designated for another type of service that, due to its particular use case, is neither significantly affected by interference from the adjacent bands nor significantly interferes with the adjacent bands.

Unused band, unused spectrum, restricted band, restricted spectrum, and/or restricted resource blocks are some of the alternate terminologies used to describe guard bands. All of these terms may have substantially the same meaning, i.e., part of unused spectrum or spectrum with limited use to reduce/prevent interference between 2 wireless systems.

Formal Guard Band Allocation

Frequency coordination may be an effective method in which a guard space is used to separate systems sharing the same frequency spectrum or occupying adjacent frequency spectrum. Frequency coordination is usually thought of as a formal process by which a frequency and a coverage area are assigned to an applicant. Guard bands may then be statically decided by a regulatory body. The guard band may also be decided mutually by the individual parties operating their systems in adjacent bands or carriers. For example, operator A and operator B operating LTE (Long Term Evolution) TDD (Time Division Duplex) systems using adjacent carrier frequencies may decide to keep a guard band of 5 Mega Hertz (MHz). This can be realized, for example, using equal spectrum contribution from each operator (i.e., each operator may agree to set aside 2.5 MHz of unused spectrum). An example of a guard band is illustrated in FIG. 3 for an 800 MHz land-mobile band and an associated guard band.

The statically assigned guard bands may not be efficient from a spectrum utilization point of view. Furthermore, they may or may not be sufficient, depending on the location of transmitters and receivers and the transmit power level. Additional means of dealing with the interference may thus be used as discussed below.

Duplex antenna combining. Duplexing is a way to reduce interference when an antenna is shared by a transmitter and a receiver. The technique includes combining, for example, a base station's transmitter antenna and receiver antenna into a single antenna through a duplexer which attenuates the transmitter's signal and reduces/prevents entry of the transmitter's signal into the receiver to a practical extent.

Physical separation of BS transmitter antenna(s) and BS receiver antenna(s) (see FIG. 4a). As shown in FIG. 4a, for example, a statically allocated 2 MHz guard band may be sufficient for non-collocated BS transmitters and receivers, but not for BS transmitters and receivers located at a same antenna tower. In FIGS. 4a, 4b, 4c, the terms "mobile Tx" refers to a mobile terminal that is transmitting, "mobile Rx" refers to a mobile terminal that is receiving, "base Tx" refers to a base station that is transmitting, and "base Rx" refers to a base station that is receiving.

Interference between mobile transmitter and mobile receiver (see FIG. 4b). A guard band between UE (mobile) transmitter frequency spectrum and UE (mobile) receiver frequency spectrum may be less practical because a large guard band may be needed compared to the BS-to-BS case due to more relaxed requirements for mobiles and practical filter limitations.

Effective guard bands by geographical reuse for BS-to-mobile and mobile-to-BS scenarios. By exploiting geolocation of transmitters and receivers and by exploiting the fact that the inter-channel interference for BS-to-mobile and mobile-to-BS may typically be less significant (e.g. due to height difference or isolation), a true guard band may be omitted. For example, see FIG. 4c.

In general, guard bands may be very effective at reducing effects of OOBE from narrowband systems because the OOBE of a narrowband transmitter may roll off significantly in a practical-sized guard band (e.g., approximately 1 MHz). Broadband signals, however, may have broader OOBE spectrums, and aggressive filtering may still be required to substantially reduce OOBE with a 1 MHz guard band, which may only be practical at base stations.

In some exceptions, a slightly higher performance degradation may be accepted as a worst case while allowing for a more dynamic guard band control. For example, to reduce/prevent OOBE from 700 MHz C Block LTE mobile transmitters from interfering with public safety mobiles in the 700 MHz public safety block, a special mode was created in the 3GPP standard that results in lower OOBE but also reduces throughput. The special mode is under the control of the cellular operator and is turned on through a downlink message on a cell-by-cell basis.

However, this may not just be a problem between LTE and narrowband public safety. Any mobile receivers operating in the 700 MHz spectrum may be affected by the OOBE because the 1 MHz guard band between the base and mobile transmit bands may be insufficient for significant attenuation of broadband signals. On the other hand, the 1 MHz guard band between Block C and the D/Public Safety Spectrum Trust (PSST) blocks may provide sufficient room for filters on the broadband base transmitters to attenuate the base-generated OOBE, reducing potential interference near base stations.

The operation of two unsynchronized TDD systems in adjacent carriers is another scenario where guard bands may be required. In TDD, UL and DL subframes operate on the same carrier. Without any guard band, cross UL and DL subframe interference may lead to severe performance degradation at the UE receiver (e.g., due to UE to UE interference) as well as at the BS receiver (e.g., due to BS to BS interference). This cross UL/DL subframe interference may even lead to complete disruption of the service, for example, if UEs on two carriers are quite close. Therefore, a guard band is required between the two unsynchronized TDD carriers.

The operation of a TDD system and an FDD system using adjacent carriers is another scenario where guard bands may be required. The adjacent TDD and FDD carriers may belong to different frequency bands, but the bands are adjacent. An example is operation in 2.6 GHz, for example, LTE FDD band 7 and LTE TDD band 38. The TDD band 38 operates in the center of FDD band 7. Therefore, to reduce, avoid, and/or minimize inter-system interference, restricted use of 5 MHz of spectrum on each edge of the TDD band 38 may be recommended. The restricted usage corresponds to the guard band in a sense that both LTE TDD UE and LTE TDD BS transmissions at the edges of band 38 are allowed at very low output power.

Multi-Carrier and Carrier Aggregation System

To increase/enhance peak-rates within a technology, multi-carrier or carrier aggregation solutions are known. Each carrier in a multi-carrier or carrier aggregation system may generally be termed as a component carrier (CC) or sometimes is also referred to as a cell. The term carrier aggregation (CA) may also be referred to using terms such as "multi-carrier system", "multi-cell operation", "multi-carrier operation", "multi-carrier" transmission, and/or reception. This means the CA is used for transmission of signaling and data in the uplink and downlink directions. One of the CCs is the primary carrier or anchor carrier and the remaining CCs are called secondary or supplementary carriers. Generally, the primary or anchor CC carries the essential UE specific signaling. The primary CC exists in both uplink and direction CA. The network may assign different primary carriers to different UEs operating in the same sector or cell. Thanks to carrier aggregation, the UE has more than one serving cell: one primary serving cell and one or more secondary serving cell(s). The serving cell may alternatively be referred to as a primary cell (PCell) or primary serving cell (PSC). Similarly the secondary serving cell may be referred to as a secondary cell (SCell) or secondary serving cell (SSC). Regardless of the terminology, the PCell and SCell(s) enable the UE to receive and transmit data. More specifically the PCell and SCell exist in DL and UL for the reception and transmission of data by the UE. The remaining non-serving cells on the Primary Component Carrier (PCC) and Secondary Component Carrier (SCC) are called neighbor cells.

The CCs belonging to the CA may belong to the same frequency band (also referred to as intra-band CA) or to a different frequency band(s) (inter-band CA) or any combination thereof (e.g., 2 CCs in band A and 1 CC in band B). The carriers in intra-band CA can be adjacent (also referred to as contiguous) or non-adjacent (also referred to as non-contiguous). In non-adjacent intra-band CA, the carriers in gaps may typically be used by other operators. Typically, in intra-band CA, the UE may require a single RF receiver chain and RF transmitter chain to receive and transmit the aggregated carriers respectively, especially when the total aggregated carriers are within a certain limit (e.g. 20 MHz in total for High Speed Packet Access (HSPA) or 40 MHz in total for LTE). Otherwise, the UE may have to implement multiple RF transmitter/receiver chains for an aggregated larger number of carriers and particularly in case of non-contiguous CA.

The inter-band CA including carriers distributed over two bands is also referred to as dual-band-dual-carrier High Speed Downlink Packet Access (DB-DC-HSDPA) in HSPA. Furthermore the CCs in intra-band CA may be adjacent or non-adjacent in frequency domain (also referred to as intra-band non-adjacent CA). A hybrid CA including intra-band adjacent CA, intra-band non-adjacent CA, and inter-band CA is also possible.

In HSPA release 10 (also referred to as 4C-HSDPA), up to 4 DL carriers can be aggregated where the DL carriers or DL cells may belong to the same frequency band or may be split over two different frequency bands (e.g. 3 adjacent DL carriers in band I at 2.1 GHz and 1 DL carrier in band VIII at 900 MHz). In HSPA Rel-11 (also referred to as 8C-HSDPA), up to 8 DL carriers may be aggregated, and the DL carriers may be distributed over 2 or even more bands. In the present version of the HSPA and LTE specifications (i.e., rel-10), all the carriers that belong to one frequency band may have to be adjacent when configured by higher layers (e.g. RRC or Radio Resource Control). The operation on non-adjacent carriers within the same band, however, may result from the carrier activation/deactivation, which is performed by the lower layers (e.g., the MAC or Media Access Control layer). As stated above, however, the non-adjacent carriers within the same band may also be configurable provided that the UE supports this capability.

In principle, up to 5 DL carriers and 5 UL carriers (each of up to 20 MHz) may be aggregated by the UE in LTE intra-band CA. Even more carriers may be introduced in future releases. UE requirements exist for at least 2 DL carriers and 2 UL carriers (e.g., up to 40 MHz in UL and DL) according to release 10. The intra-band non-contiguous CA is also possible in LTE both in the DL and UL. The UE may use single RF chain or multiple RF chains depending upon the aggregated bandwidth.

In LTE inter-band CA, up to 5 DL and 5 UL carriers (each of up to 20 MHz and belonging to different bands) can be aggregated by the UE. Even additional carriers belonging to different bands may be introduced in future releases. UE requirements exist for at least 2 DL carriers belong to 2 different bands and 1 UL carriers in release 10. The requirements for 2 UL inter-band CA are being introduced in release 11. Typically, for inter-band CA, the UE has an independent RF chain for each CC which may belong to a different frequency band.

The CCs in CA may or may not be co-located in the same site or base station. For example, the CCs may originate (i.e., may be transmitted/received) at different locations (e.g. from non-located BS, RRH or remote radio head, or RRU or remote radio unit). Examples of combined CA and multi-point communication include DAS (Distributed Antenna System), RRH (Remote Radio Head), RRU (Remote Radio Unit), CoMP (coordinated multip-point), and multi-point transmission/reception, etc. Embodiments discussed herein may also apply to multi-point carrier aggregation systems.

Various of the above described approaches may exhibit one or more of the following deficiencies:

1) Static guard band allocation is not an efficient way of utilizing the spectrum.

2) Static guard bands may not solve all interference problems unless the guard band allocation is very wide resulting in low spectrum utilization.

3) The guard band is required only when 2 systems which require a guard band are in the same geographical area. However in a large network the two systems may not be operating in all the sites at the same time. However, the existing methods enable guard band in static manner without considering the real time situation. This leads to wastage of spectrum.

Unless otherwise indicated herein, the approaches described in this section are not prior art to the claims in any application claiming priority from this application and are not admitted to be prior art by inclusion in this section.

SUMMARY

It is therefore an object of embodiments herein to provide an improved way of handling information related to a guard band used or required in a radio spectrum in a wireless communications network.

According to a first aspect of embodiments herein, the object is achieved by a method in a first node for handling information related to a guard band used or required in a radio spectrum in a wireless communications network. The first node is comprised in the wireless communications network. The method comprises obtaining information from a second node or a third node in the wireless communications network. The information is related to the guard band used or required in the radio spectrum used by the second node. The method further comprises adapting one or more procedures related to the radio operation within the wireless communications network, based on the obtained guard band information.

According to a second aspect of embodiments herein, the object is achieved by a method in a second node for handling information related to a guard band used or required in a radio spectrum in a wireless communications network. The second node is comprised in the wireless communications network. The method comprises sending information to the first node in the wireless communications network. The information is related to the guard band used or required in the radio spectrum used by the second node.

According to a third aspect of embodiments herein, the object is achieved by a method in a third node for handling information related to a guard band used or required in a radio spectrum in a wireless communications network. The third node is comprised in the wireless communications network. The method comprises sending information to the first node in the wireless communications network. The information is related to the guard band used or required in the radio spectrum used by the second node in the wireless communications network.

According to a fourth aspect of embodiments herein, the object is achieved by a first node for handling information related to a guard band used or required in a radio spectrum in a wireless communications network. The first node is adapted to be comprised in the wireless communications network. The first node comprises an obtaining circuit configured to obtain information from the second node or the third node in the wireless communications network. The information is related to the guard band used or required in the radio spectrum used by the second node. The method further comprises an adapting circuit configured to adapt one or more procedures related to the radio operation within the wireless communications network, based on the obtained guard band information.

According to a fifth aspect of embodiments herein, the object is achieved by a second node for handling information related to a guard band used or required in a radio spectrum in a wireless communications network. The second node is adapted to be comprised in the wireless communications network. The second node comprises a sending circuit configured to send information to a first node in the wireless communications network. The information is related to the guard band used or required in the radio spectrum used by the second node.

According to a sixth aspect of embodiments herein, the object is achieved by a third node for handling information related to a guard band used or required in a radio spectrum in a wireless communications network. The third node is adapted to be comprised in the wireless communications network. The third node comprises a sending circuit configured to send information to a first node in the wireless communications network. The information is related to the guard band used or required in the radio spectrum used by the second node in the wireless communications network.

By using the described signaling methods pertaining to the exchanges of information among nodes in the wireless communication network, such as by obtaining information from a second node or a third node, the information being related to the guard band used or required in the radio spectrum used by the second node, an improved method to handle information related to a guard band used or required in a radio spectrum in a wireless communications network is provided. The signaling processes disclosed herein, which do not currently exist, for example, enable dynamic guard band allocation on the need basis. The advanced signaling mechanisms disclosed herein also diminish wastage of spectrum because they allow for utilization of spectrum in such situations where the part of the spectrum containing the guard band may be used.

Various embodiments disclosed herein may provide one or more of the following potential advantages over previously known approaches:

A particular advantage of the embodiments herein is an increased awareness among the network nodes about the use of guard band in certain coverage areas.

A further particular advantage of the embodiments herein is an improved network performance and co-existence of multiple systems.

Another particular advantage of the embodiments herein is a flexible and dynamic guard band configuration and more efficient usage of the spectrum; guard band related procedures and requirements are used only in valid co-existence scenarios.

Another particular advantage of the embodiments herein are improved measurement procedures when guard band is used in the network.

Yet another particular advantage of the embodiments herein is a flexible interference control in critical parts of the band and overall reduction of interference in a victim system when guard band is used in a victim and/or aggressor systems.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 2 illustrates a table of operational bands for E-UTRA.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

FIGS. 5a-d depict a wireless communications network 500 in which embodiments herein may be implemented. The wireless communications network 500 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Worldwide Interoperability for Microwave Access (WiMax), or any cellular network or system.

Figure 1:
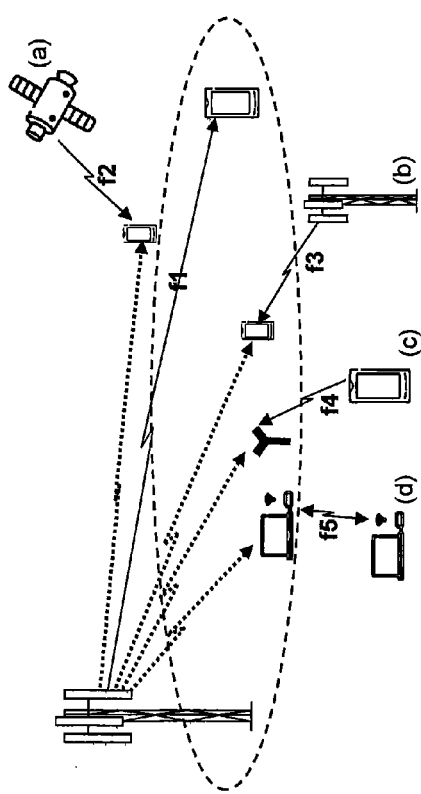
FIG. 1 illustrates a wireless communications network that includes user equipment, radio network nodes, network nodes which can be configured to operate according to some embodiments.
Figure 3:
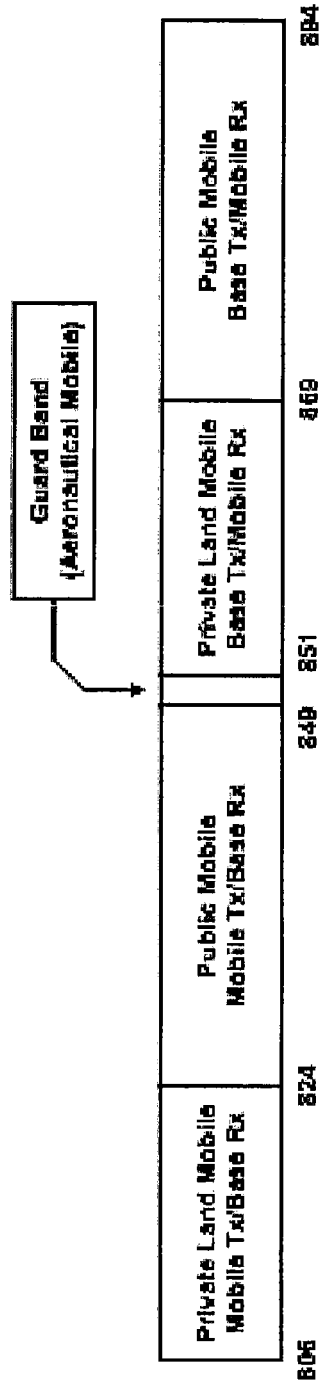
FIG. 3 illustrates a guard band between a public mobile band and a private land mobile band.
Figure 4A:
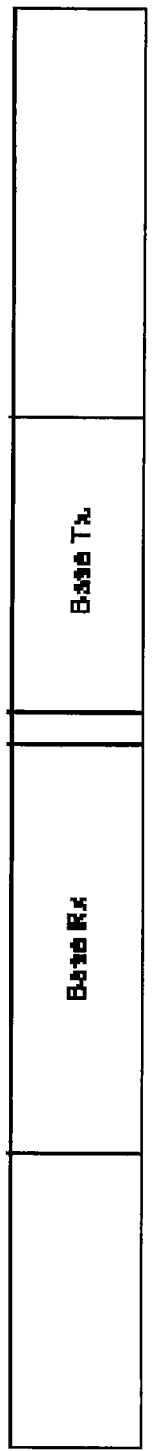
FIGS. 4a-4c illustrate guard bands that are provided between adjacent transmitter and receiver bands.
Figure 4B:
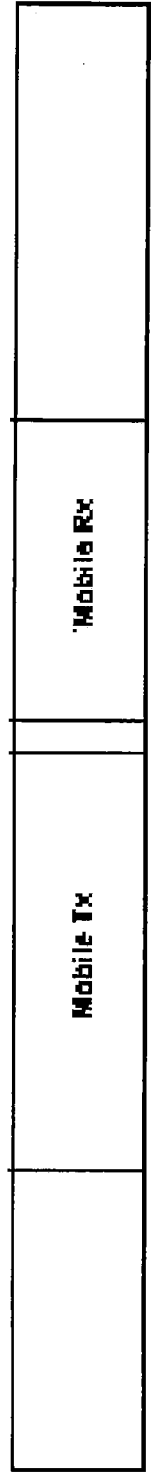
Figure 4C:
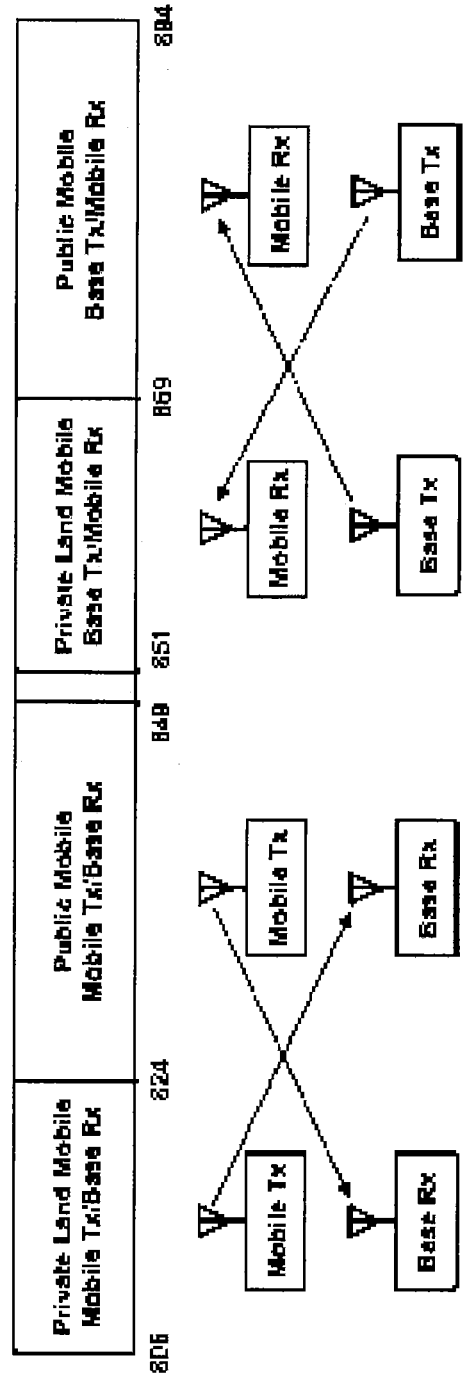
Figure 5A:
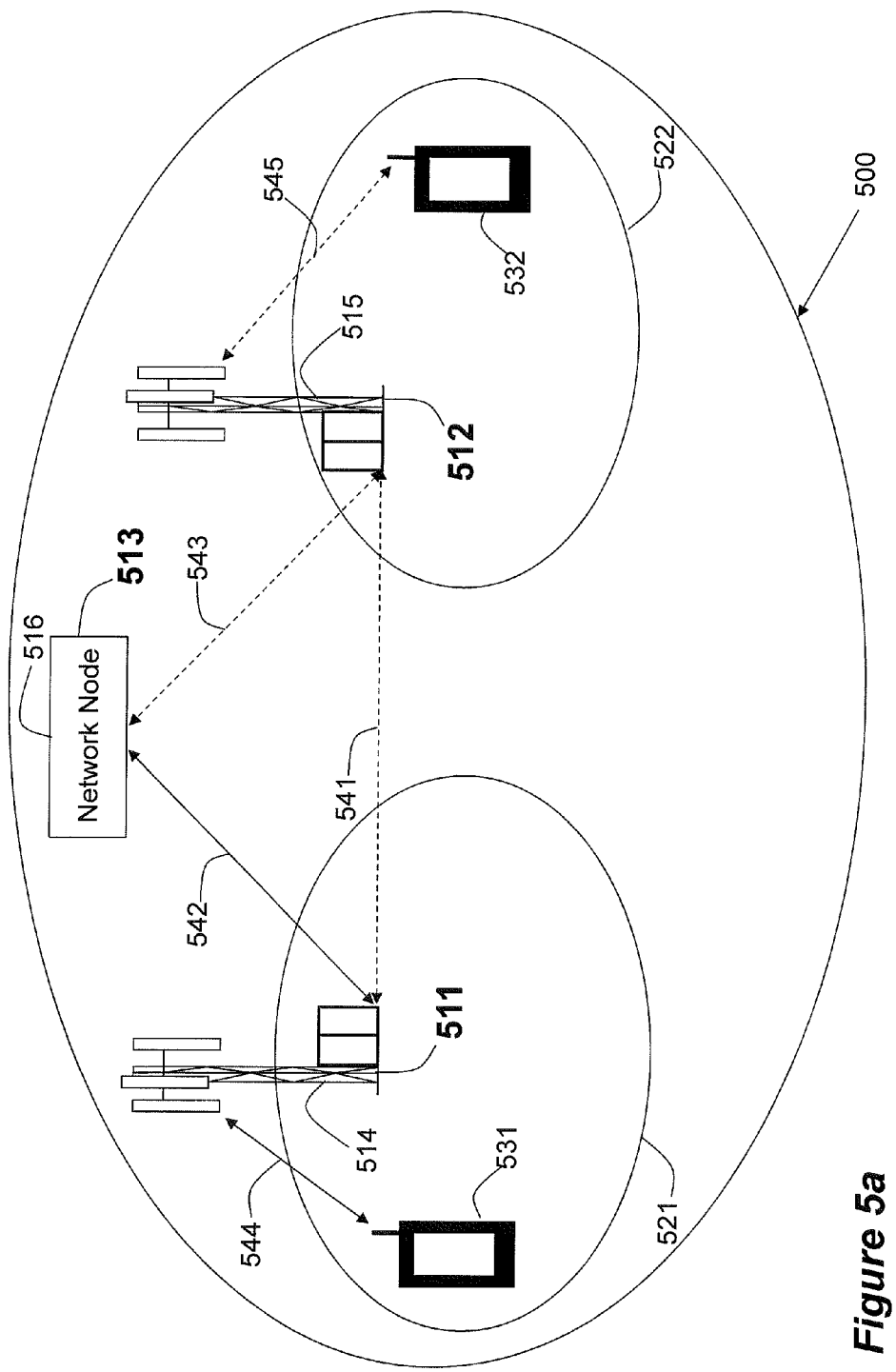
FIG. 5 is a schematic block diagram illustrating a wireless communications network.
Figure 5B:
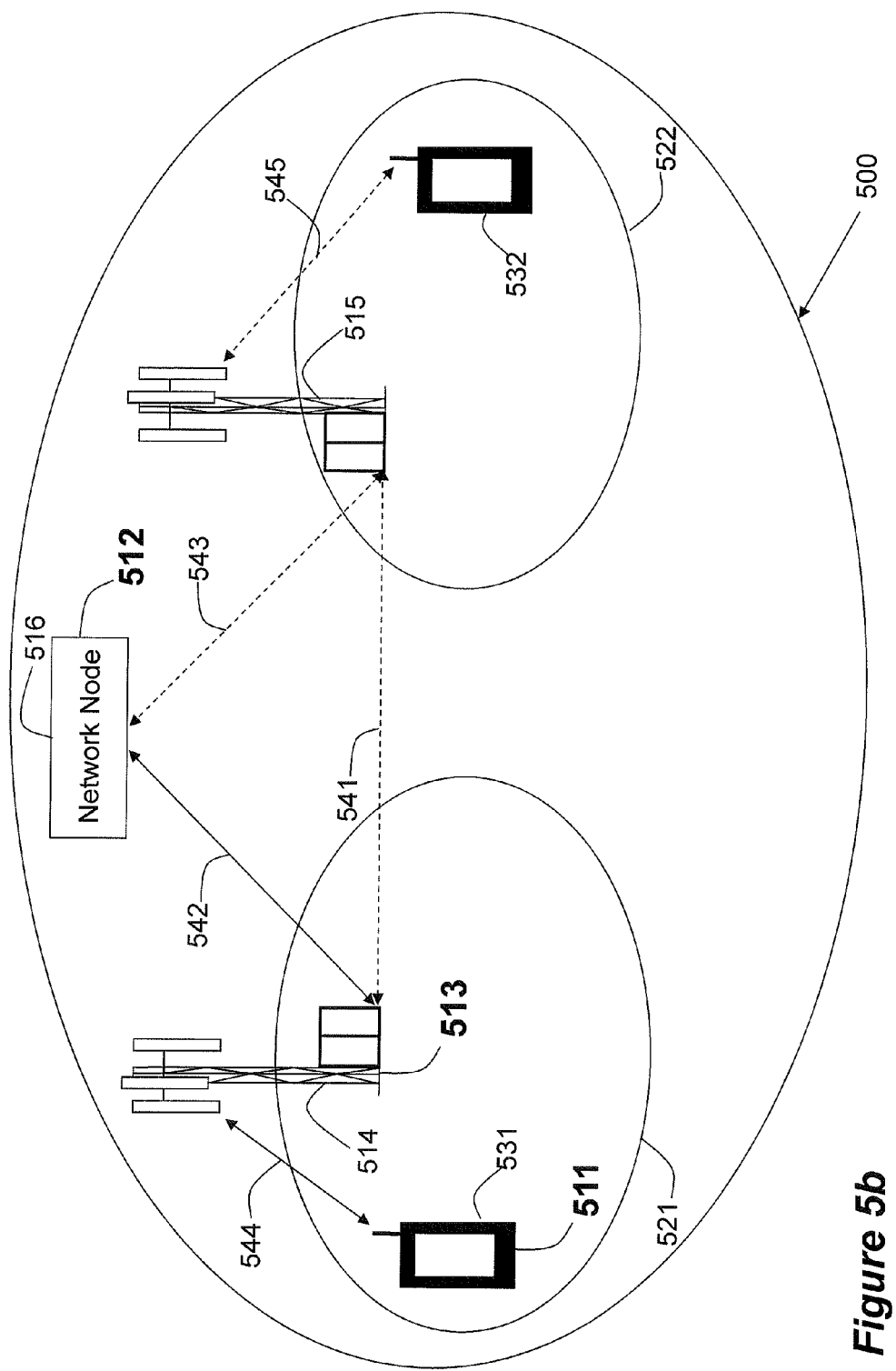
Figure 5C:
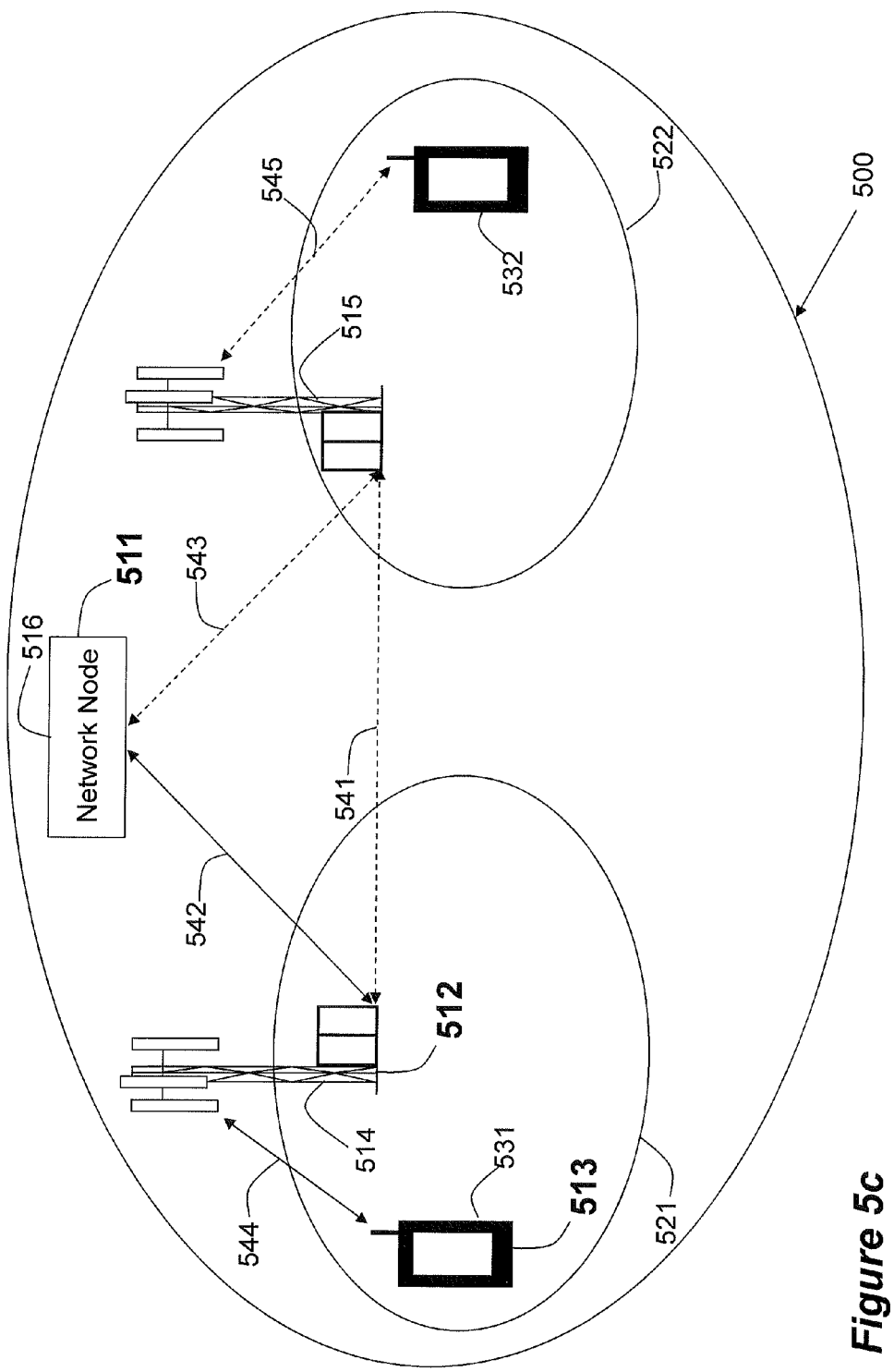
Figure 5D:
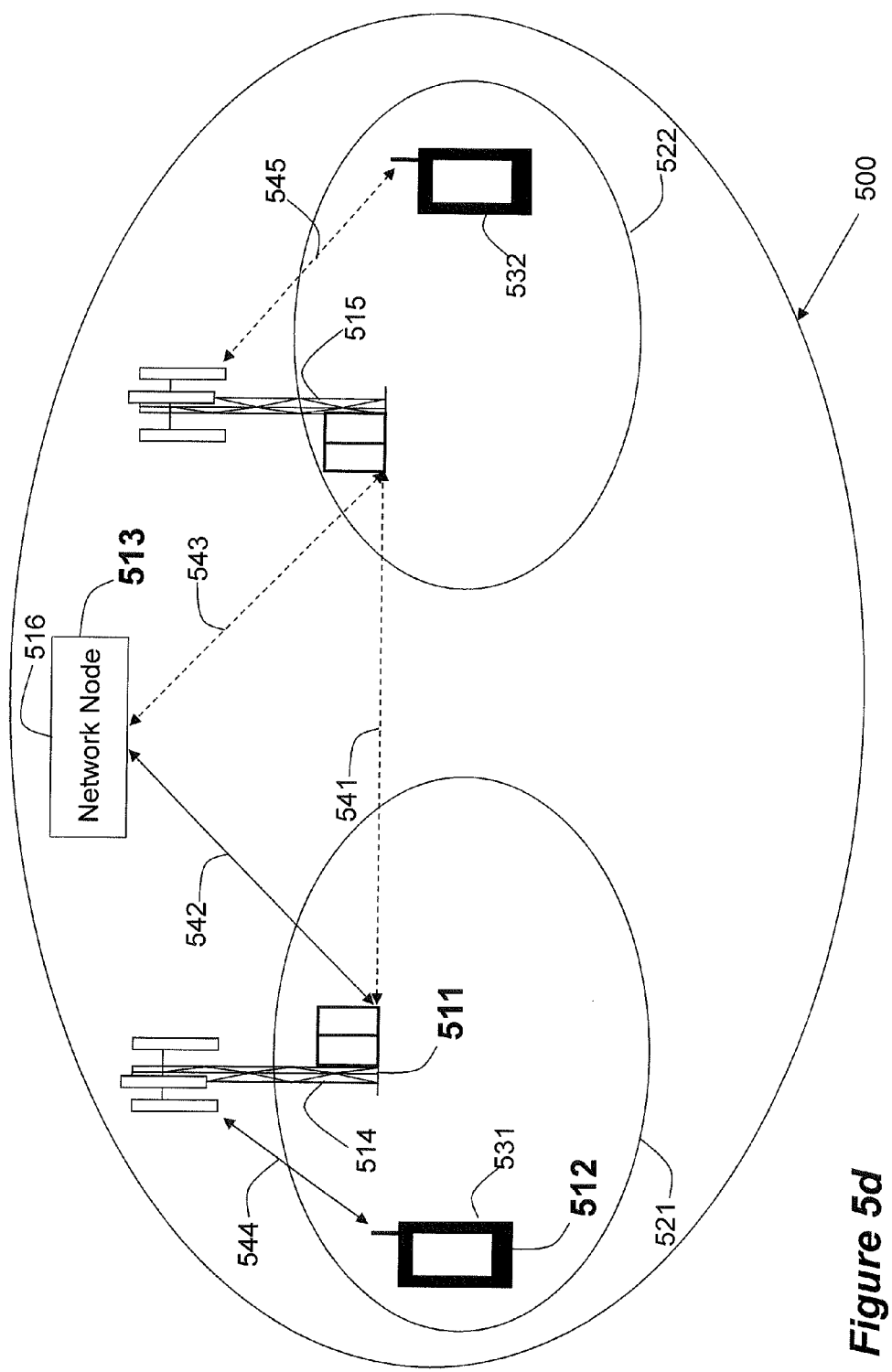

The wireless communications network 500 comprises a first node 511, a second node 512, and a third node 513. In the embodiment of FIG. 5a, and for illustrative purposes only, each of the first node 511, the second node 512 and the third node 513 may be network nodes. However, in other embodiments, such as those depicted in FIGS. 5b-d, any of the first node 511, the second node 512 and the third node 513 may also be any of a wireless device, a radio network node, or a network node in general, as defined below. The wireless communications network 500 comprises a first radio node 514 and a second radio node 515. Each of the first radio node 514 and the second radio node 515 may be, for example, base stations such as e.g. an eNB, eNodeB, or a Home Node B, a Home eNode B, femto Base Station, BS, pico BS or any other network unit capable to serve a device or a machine type communication device in a wireless communications network 500. In some particular embodiments, the first radio node 514 or the second radio node 515 may be a stationary relay node or a mobile relay node. The mixed wireless network 500 covers a geographical area which is divided into cell areas, wherein each cell area is served by a network node, although, one network node may serve one or several cells. In the examples depicted in FIG. 5a-d, the first radio node 514 serves a first cell 521, and the second radio node 515 serves a second cell 522. Each of the first radio node 514 and the second radio node 515 may be of different classes, such as e.g. macro eNodeB, home eNodeB or pico base station, based on transmission power and thereby also cell size. Typically, wireless communications network 500 may comprise more cells similar to 521 and 522, served by their respective network nodes. This is not depicted in FIGS. 5a-d for the sake of simplicity. Each of the first radio node 514 and the second radio node 515 may support one or several communication technologies, and its name may depend on the technology and terminology used. In 3GPP LTE network nodes, which may be referred to as eNodeBs or even eNBs, may be directly connected to one or more core networks.

In some embodiments, such as in that depicted in FIG. 5a, the third node 513 may be a network node 516. The network node 516 may be, for example, a "centralized network management node" or "coordinating node", which is a network node, which may also be a radio network node, which coordinates radio resources with one or more radio network nodes and/or UEs. Some examples of the coordinating node are network monitoring and configuration node, Operations Support System (OSS) node, Operations & Maintenance (O&M) node, Minimization of Drive Tests (MDT) node, Self-Organizing Network (SON) node, positioning node, a gateway node such as Packet Data Network Gateway (P-GW) or Serving Gateway (S-GW) network node or femto gateway node, a macro node coordinating smaller radio nodes associated with it, etc.

Further detailed information on network node and radio network node is provided below under the subheading "GENERALIZATIONS".

The first radio node 514 may e.g. communicate with the second radio node 515 over a link 541 and communicate with the network node 516 over a link 542. The second radio node 515 may communicate with the network node 516 over a link 543.

A number of wireless devices are located in the wireless communications network 500. In the example scenarios of FIGS. 5a-d, only two wireless devices are shown, first wireless device 531, and second wireless device 532. The first wireless device 531 may e.g. communicate with the first radio node 514 over a radio link 544. The second wireless device 532 may communicate with the second radio node 515 over a radio link 545.

Each of the first wireless device 531 and second wireless device 532 is a wireless communication device such as a UE which is also known as e.g. mobile terminal, wireless terminal and/or mobile station. The device is wireless, i.e., it is enabled to communicate wirelessly in a wireless communication network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network.

Each of the first wireless device 531 and second wireless device 532 may further be referred to as a mobile telephone, cellular telephone, or laptop with wireless capability, just to mention some further examples. Each of the first wireless device 531 and second wireless device 532 in the present context may be, for example, portable, pocket-storable, handheld, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

Further detailed information of the first node 511, second node 512, third node 513 and the wireless communications network 500 is provided below under the subheading "GENERALIZATIONS".

As stated earlier, and as it is explained in detail in under the headings and subheadings following the actions and systems claimed herein, any of the first node 511, the second node 512 or the third node 513 may be one of: a first radio node 514, a second radio node 515, a network node 516, or a wireless device 531, 532.

Figure 6:
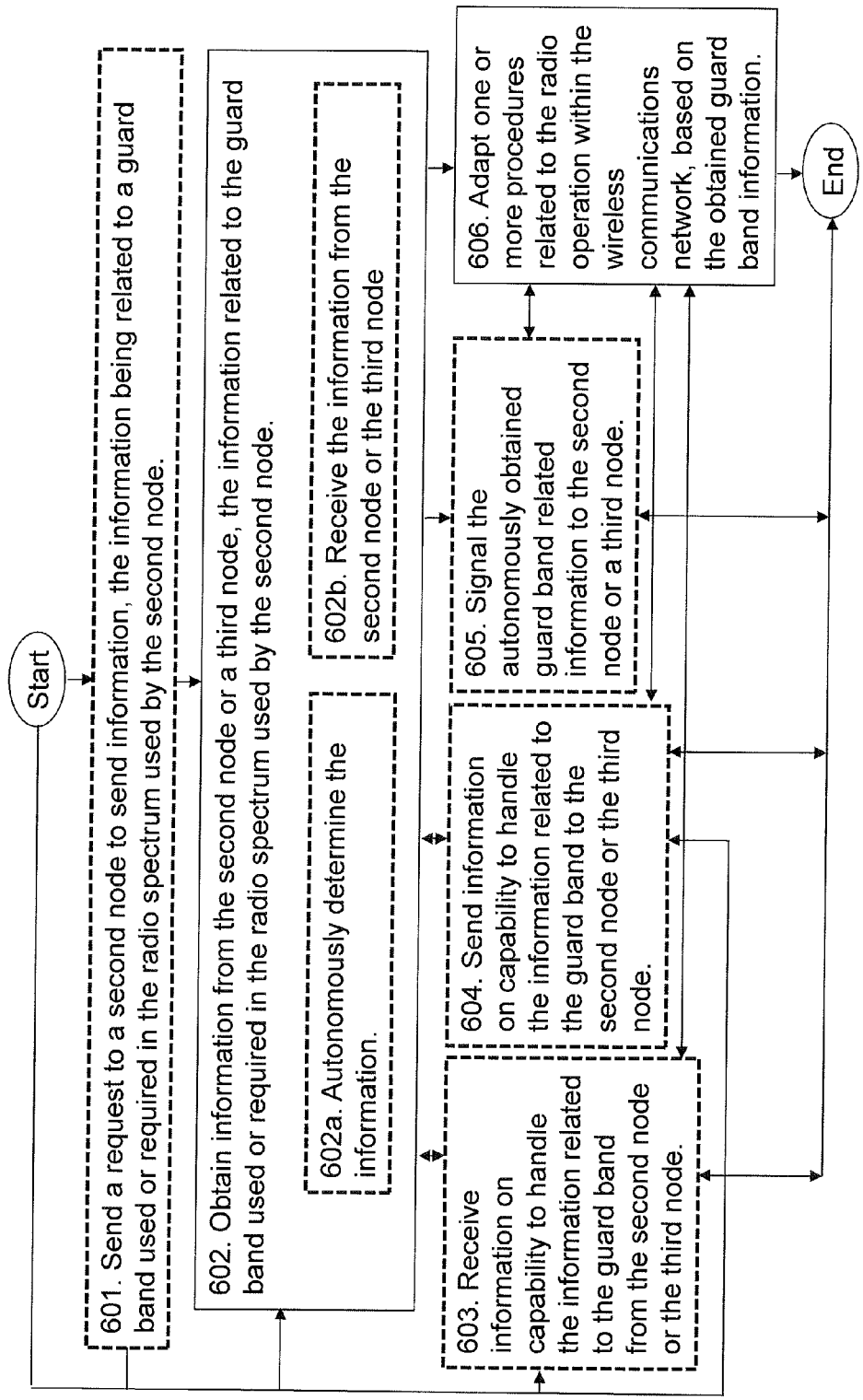
FIG. 6 is a flowchart depicting embodiments of a method in first node.

Example of embodiments of a method in a first node 511 for handling information related to a guard band used or required in a radio spectrum in the wireless communications network 500, will now be described with reference to a flowchart depicted in FIG. 6. The first node 511, the second node 512 and the third node 513 are comprised in the wireless communications network 500.

In some embodiments, the guard band comprises an unused spectrum or a spectrum with restricted operation. The restricted operation is typically realized by allowing the transmitter to transmit at lower power level, i.e., below a certain threshold.

Further detailed information of the guard band is provided below under the subheading "GENERALIZATIONS".

The method comprises the following actions, which actions may be taken in any suitable order. Dashed lines of some boxes in FIG. 6 indicate that the action is not mandatory.

Action 601

In some embodiments, the first node 511 may send a request to the second node 512 to send information, the information being related to the guard band used or required in the radio spectrum used by the second node 512. This is an optional action.

The action of sending a request is described below in further detail under the subheading "SIGNALING EVENTS", as "reporting upon receiving an explicit request".

These embodiments are described below in further detail under the subheading "GUARD BAND RELATED INFORMATION".

Action 602

In this action, the first node 511 obtains, from the second node 512 or the third node 513 in the wireless communications network 500, the information being related to the guard band used or required in the radio spectrum used by the second node 512, as described in action 601.

In some embodiments, the obtaining may be executed upon request or indication by one of the first node 511 or the third node 513 in the wireless communications network 500. In some embodiments, the obtaining may be executed by proactive reporting by the second node 512.

In some embodiments, the information related to the guard band may be pre-defined or configurable. When the information related to the guard band is configurable, it may be configurable by one of: the first node 511, the second node 512 and the third node 513 in the wireless communications network 500.

In some embodiments, the information related to the guard band may comprise at least one of: an indication of activation/deactivation of the guard band, band information of a band for which the guard band applies, co-existence scenario in which the guard band applies, duplex mode of operation in which the guard band applies, frequency-domain resources associated with the guard band, applicable node, time-domain resources or parameters associated with the guard band, power restriction that applies for the guard band, and geographical area or location where the guard band is applicable.

Each one of these components of the guard band is described below in further detail under the subheading "GUARD BAND CONFIGURATION".

Methods of performing the obtaining step are described below in further detail under the heading "METHODS OF OBTAINING THE GUARD BAND RELATED INFORMATION", and its respective subheadings.

Action 602a

In some embodiments, obtaining may comprise autonomously determining the information related to the guard band in the radio spectrum. This is an optional action.

In some of these embodiments, determining may comprise at least one of: measuring and sensing signals.

The determining action is described below in further detail under the subheading "APPROACH 2: IMPLICIT METHOD OF OBTAINING GUARD BAND RELATED INFORMATION".

Action 602b

In some embodiments, the obtaining may comprise receiving the information from the second node 512 or the third node 513. This is an optional action.

This action is described below in further detail under the subheading "APPROACH 1: EXPLICIT APPROACH FOR OBTAINING GUARD BAND RELATED INFORMATION".

Action 603

In some embodiments, the first node 511 may receive information on a capability to handle the information related to the guard band from at least one of: the second node 512 and the third node 513, wherein each of the second node 512 and the third node 513 is a radio node, such as the first radio node 514, the second radio node 515, the first wireless device 531, and the second wireless device 532. This is an optional action.

Guard band capability is described below in further detail under the suheading "GUARD BAND HANDLING CAPABILITY".

Action 604

In some embodiments wherein the first node 511 is a radio node, such as the first radio node 514, the second radio node 515, the first wireless device 531, and the second wireless device 532, the first node 511 may send information on capability to handle the information related to the guard band to at least one of: the second node 512 and the third node 513.

In some embodiments pertaining to actions 603 and 604, the capability to handle the information related to the guard band comprises capability to create a guard band according to at least one of: pre-defined rules and received instructions from the first node 511.

This action is described below in further detail under the subheading "GUARD BAND HANDLING CAPABILITY".

Action 605

In some embodiments wherein the first node 511 may autonomously determine the information related to the guard band in the radio spectrum, the first node 511 may signal the autonomously obtained guard band related information to the second node 512 or the third node 513.

This action is described below in further detail under the subheading "SIGNALING EVENTS".

Action 606

In this action, the first node 511 may adapt one or more procedures related to the radio operation within the wireless communications network 500, based on the obtained guard band information. The one or more procedures at least involve the first node 511, or are managed by first node 511. In some embodiments, the one or more procedures may be performed by the first node 511. In other embodiments, the one or more procedures may be performed by other nodes in the wireless communications network 500, such as the second node 512 or the third node 513, or other structures in the wireless communications network 500.

In some embodiments, the one or more procedures related to a radio operation within the wireless communications network 500 may be one or more of: adaptation of measurement procedures, adaptation of mobility procedures, adaptation of resource assignment and scheduling procedures, adaptation of requirements, monitoring of the network performance, radio network planning and testing procedures.

The one or more procedures related to a radio operation within the wireless communications network 500 are described below in further detail under the heading "METHODS AND OPERATIONS FOR USING THE GUARD BAND RELATED INFORMATION IN A NETWORK", and its respective subheadings.

Figure 7:
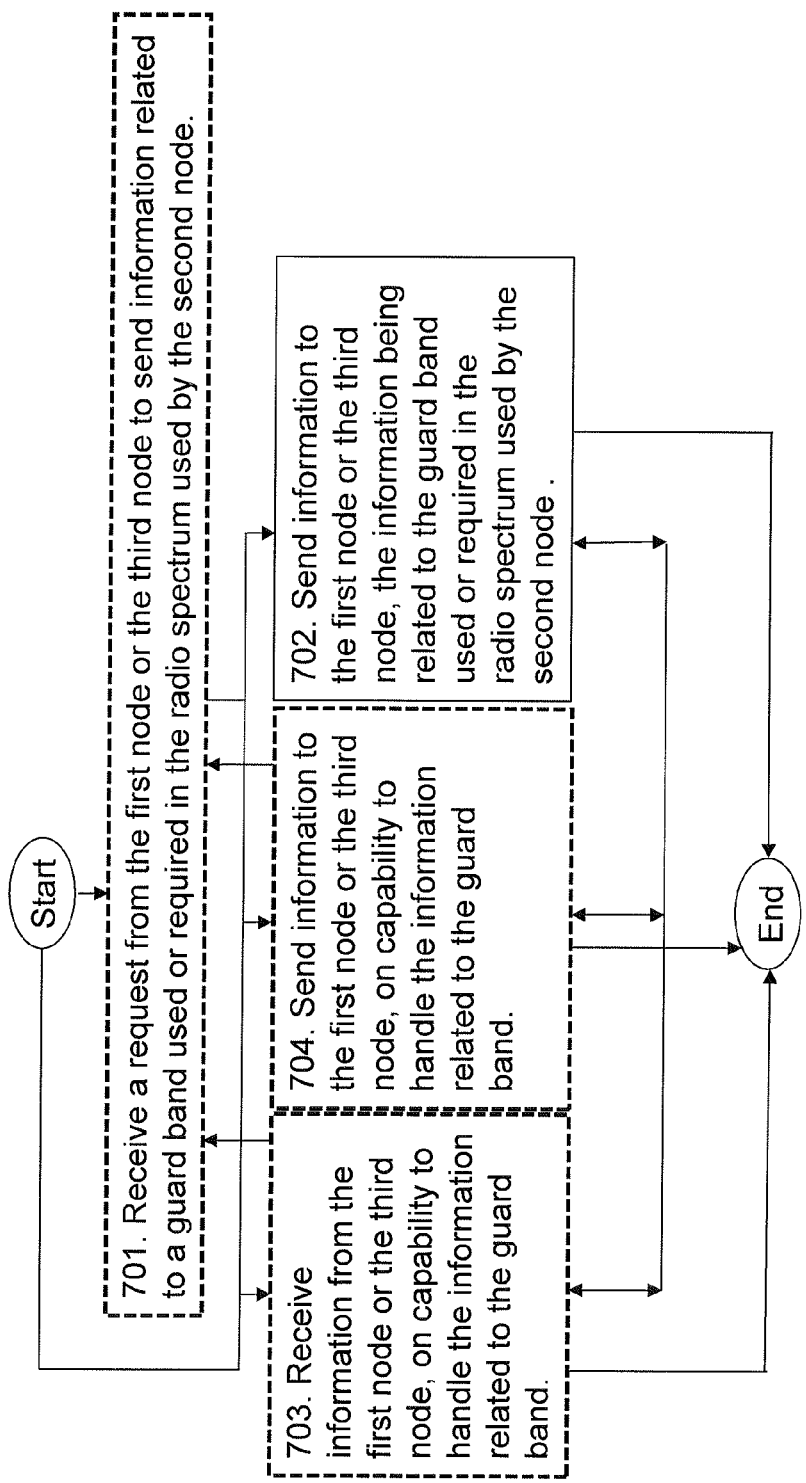
FIG. 7 is a flowchart depicting embodiments of a method in second node.

Example of embodiments of a method in the second node 512 for handling information related to a guard band used or required in a radio spectrum in the wireless communications network 500, will now be described with reference to a flowchart depicted in FIG. 7. The second node 512 is comprised in the wireless communications network 500.

The detailed description of some of the following actions, which are mirror actions to those described in 601-606 for the first node 511, corresponds to the same references provided above, and will thus not be repeated here. For example, each one of the components of the guard band is described below under the subheading "GUARD BAND CONFIGURATION".

In some embodiments, the guard band may comprise an unused spectrum or a spectrum with restricted operation.

As stated earlier, any of the first node 511, the second node 512 or the third node 513 may be one of: a first radio node 514, a second radio node 515, a network node 516, or a wireless device 531, 532.

The method comprises the following actions, which actions may be taken in any suitable order. Dashed lines of some boxes in FIG. 7 indicate that the action is not mandatory.

Action 701

In this action, the second node 512 may receive a request from the first node 511 or the third node 513 to send information related to the guard band used or required in the radio spectrum used by the second node 512. This is an optional action.

Action 702

In this action, the second node 512 sends information to the first node 511 or the third node 513, the first node 511 and the third node 513 being comprised in the wireless communications network 500, the information being related to the guard band used or required in the radio spectrum used by the second node 512.

In some embodiments, the information related to the guard band may be pre-defined or configurable, wherein, when the information related to the guard band is configurable, it is configurable by one of: the first node 511, the second node 512 and the third node 513 in the wireless communications network 500.

In some embodiments, the information related to the guard band may comprise at least one of: an indication of activation/deactivation of the guard band, band information of a band for which the guard band applies, co-existence scenario in which the guard band applies, duplex mode of operation in which the guard band applies, frequency-domain resources associated with the guard band, applicable node, time-domain resources or parameters associated with the guard band, power restriction that applies for the guard band, and geographical area or location where the guard band is applicable.

Action 703

In some embodiments, the second node 512 may receive information on a capability to handle the information related to the guard band from at least one of: the first node 511, when the first node 511 is a radio node, and the third node 513, when the third node 513 is a radio node, such as the first radio node 514, the second radio node 515, the first wireless device 531, and the second wireless device 532. This is an optional action.

Action 704

In some embodiments, wherein the second node 512 is a radio node, such as the first radio node 514, the second radio node 515, the first wireless device 531, and the second wireless device 532, the second node 512 may send information on capability to handle the information related to the guard band to at least one of: the first node 511 and the third node 513. This is an optional action.

In some embodiments pertaining to actions 703 and 704, the capability to handle the information related to the guard band may comprise capability to create a guard band according to at least one of: pre-defined rules and received instructions from the first node 511.

Figure 8:
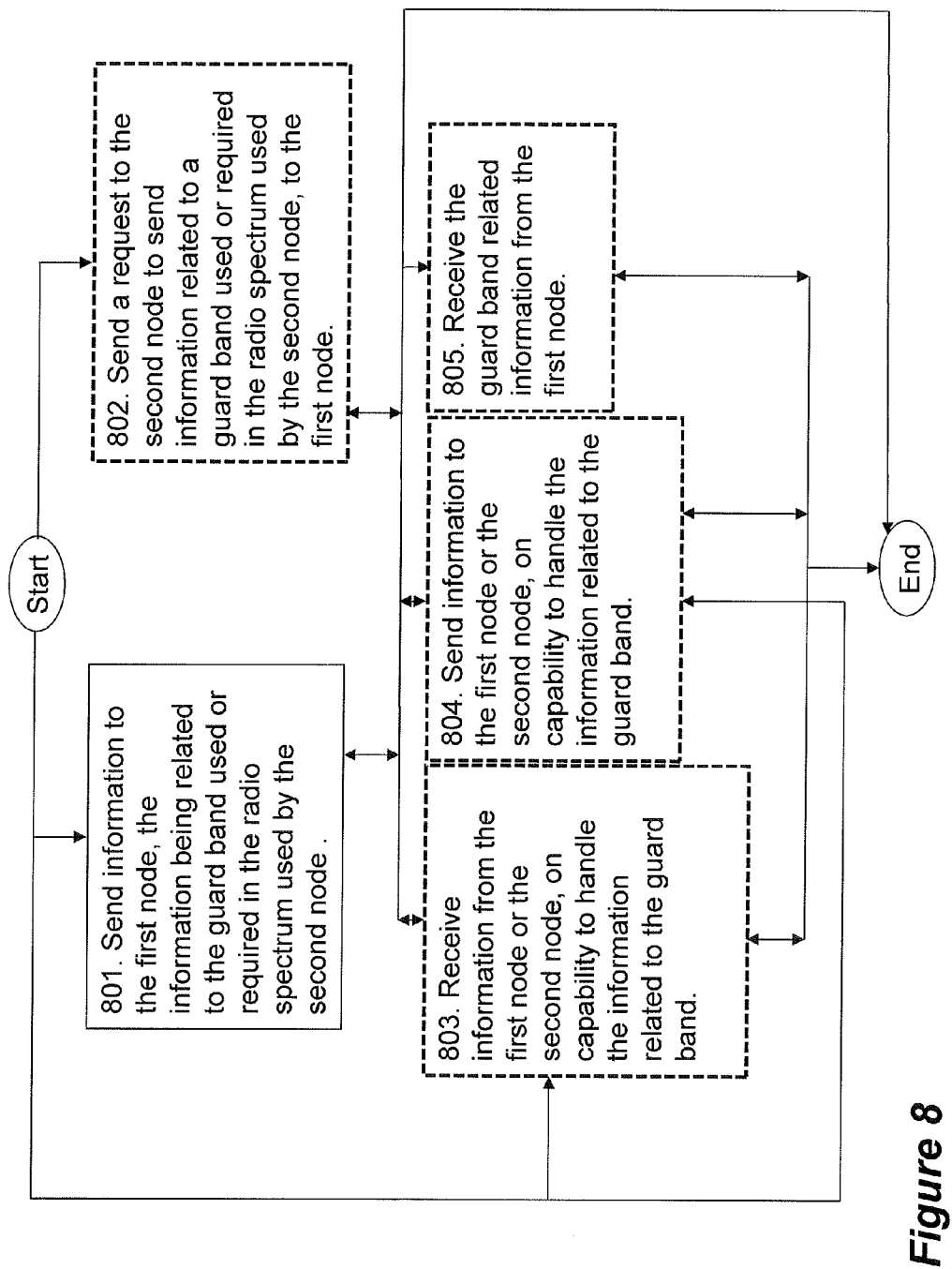
FIG. 8 is a flowchart depicting embodiments of a method in third node.

Example of embodiments of a method in a third node 513 for handling information related to a guard band used or required in a radio spectrum in a wireless communications network 500, will now be described with reference to a flowchart depicted in FIG. 8. The third node 513 is comprised in the wireless communications network 500.

The detailed description of some of the following actions, which are mirror actions to those described in 601-606 for the first node 511, corresponds to the same references provided above, and will thus not be repeated here. For example, each one of the components of the guard band is described below under the subheading "GUARD BAND CONFIGURATION".

In some embodiments, the guard band may comprise an unused spectrum or a spectrum with restricted operation.

As stated earlier, any of the first node 511, the second node 512 or the third node 513 may be one of: a first radio node 514, a second radio node 515, a network node 516, or a wireless device 531, 532.

The method comprises the following actions, which actions may be taken in any suitable order. Dashed lines of some boxes in FIG. 8 indicate that the action is not mandatory.

Action 801

In this action, the third node 513 sends information to the first node 511 in the wireless communications network 500, the information being related to the guard band used or required in the radio spectrum used by a second node 512 in the wireless communications network 500.

Action 802

This is an optional action. In some embodiments, the third node 513 may send a request to the second node 512 to send information related to a guard band used or required in the radio spectrum used by the second node 512, to the first node 511.

In some embodiments, the information related to the guard band may be pre-defined or configurable, wherein, when the information related to the guard band is configurable, it is configurable by one of: the first node 511, the second node 512 and the third node 513 in the wireless communications network 500.

In some embodiments, the information related to the guard band may comprise at least one of: an indication of activation/deactivation of the guard band, band information of a band for which the guard band applies, co-existence scenario in which the guard band applies, duplex mode of operation in which the guard band applies, frequency-domain resources associated with the guard band, applicable node, time-domain resources or parameters associated with the guard band, power restriction that applies for the guard band, and geographical area or location where the guard band is applicable.

Action 803

This is an optional action. In some embodiments, the third node 513 may receive information on capability to handle the information related to the guard band from at least one of: the second node 512, when the second node 512 is a radio node, and the first node 511, when the first node 511 is a radio node.

In some embodiments, the capability to handle the information related to the guard band may comprise capability to create a guard band according to at least one of: pre-defined rules and received instructions from the first node 511.

Action 804

This is an optional action. In some embodiments, wherein the third node 513 is a radio node, such as the first radio node 514, the second radio node 515, the first wireless device 531, and the second wireless device 532, the third node 513 may send information on capability to handle the information related to the guard band to at least one of: the second node 512 and the first node 511.

Action 805

This is an optional action. In some embodiments, the third node 513 may receive the guard band related information from the first node 511.

Figure 9:
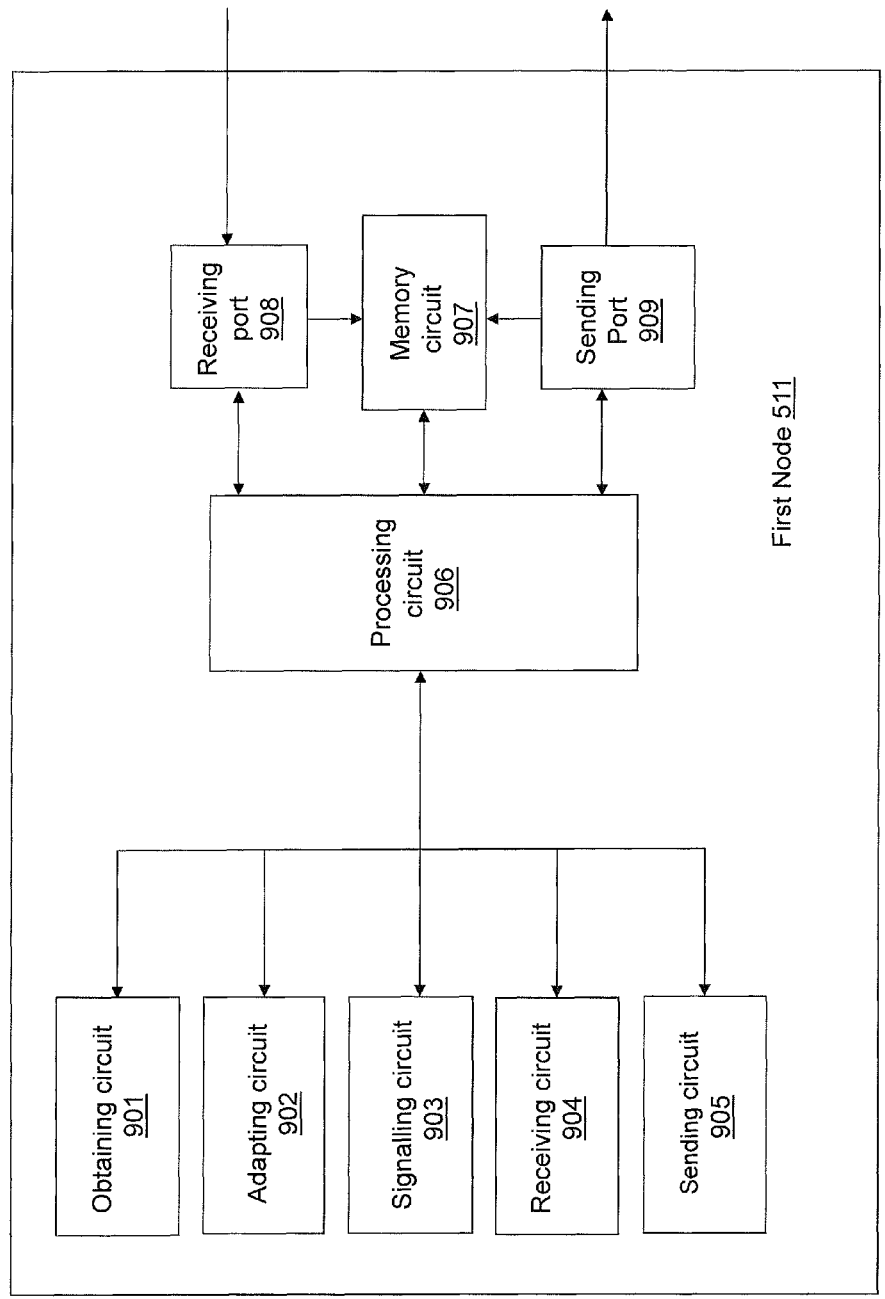
FIG. 9 is a block diagram of a first node that is configured according to some embodiments.

To perform the method actions in the first node 511 described above in relation to FIG. 6 for handling information related to a guard band used or required in a radio spectrum in a wireless communications network 500, the first node 511 comprises the following arrangement depicted in FIG. 9. The first node 511 is adapted to be comprised in the wireless communications network 500.

The detailed description of some of the following corresponds to the same references provided above, in relation to the actions described for the first node 511, and will thus not be repeated here. For example, each one of these components of the guard band is described below under the subheading "GUARD BAND CONFIGURATION".

Any of the first node 511, the second node 512 or the third node 513 may be one of: a first radio node 514, a second radio node 515, a network node 516, or a wireless device 531, 532.

The first node 511 comprises an obtaining circuit 901 configured to obtain information from a second node 512 or a third node 513 in the wireless communications network 500, the information being related to the guard band used or required in the radio spectrum used by the second node 512.

The first node 511 also comprises an adapting circuit 902 configured to adapt one or more procedures related to the radio operation within the wireless communications network 500, based on the obtained guard band information.

In some embodiments, the guard band may comprise an unused spectrum or a spectrum with restricted operation.

In some embodiments, the information related to the guard band may be pre-defined or configurable, wherein, when the information related to the guard band is configurable, it is configurable by one of: the first node 511, the second node 512 and the third node 513.

In some embodiments, the information related to the guard band may comprise at least one of: an indication of activation/deactivation of the guard band, band information of a band for which the guard band applies, co-existence scenario in which the guard band applies, duplex mode of operation in which the guard band applies, frequency-domain resources associated with the guard band, applicable node, time-domain resources or parameters associated with the guard band, power restriction that applies for the guard band, and geographical area or location where the guard band is applicable.

In some embodiments, the obtaining circuit 901 may be further configured to execute the obtaining upon request or indication by one of the first node 511 or the third node 513 in the wireless communications network 500, or by proactive reporting by the second node 512.

In some embodiments, the obtaining circuit 901 may be further configured to autonomously determine the information related to the guard band in the radio spectrum.

In some embodiments, to autonomously determine may comprise at least one of: measuring and sensing signals.

In some embodiments, the one or more procedures related to a radio operation within the wireless communications network 500 may be one or more of: adaptation of measurement procedures, adaptation of mobility procedures, adaptation of resource assignment and scheduling procedures, adaptation of requirements, monitoring of the network performance, radio network planning and testing procedures.

In some embodiments, the first node 511 may also comprise a signaling circuit 903 configured to signal the autonomously determined guard band related information to the second node 512 or the third node 513.

In some embodiments, the first node 511 may also comprise a receiving circuit 904 configured to receive information on capability to handle the information related to the guard band from at least one of: the second node 512, when the second node 512 is a radio node, such as the first radio node 514, the second radio node 515, the first wireless device 531, and the second wireless device 532, and the third node 513, when the third node 513 is a radio node, such as the first radio node 514, the second radio node 515, the first wireless device 531, and the second wireless device 532.

In some embodiments, the receiving circuit 904 may be further configured to receive the information related to the guard band used or required in the radio spectrum used by the second node 512 from the second node 512 or the third node 513.

In some embodiments, the first node 511 may also comprise a sending circuit 905 configured to send a request to the second node 512 to send the information related to the guard band used or required in the radio spectrum used by the second node 512.

In some embodiments wherein the first node 511 is a radio node, such as the first radio node 514, the second radio node 515, the first wireless device 531, and the second wireless device 532, the sending circuit 905 may be further configured to send information on capability to handle the information related to the guard band to at least one of: the second node 512 and the third node 513.

In some embodiments, the capability to handle the information related to the guard band may comprise capability to create a guard band according to at least one of: pre-defined rules and received instructions from the first node 511.

The embodiments herein for handling information related to a guard band used or required in a radio spectrum in a wireless communications network 500 may be implemented through one or more processors, such as a processing circuit 906 in the first node 511 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first node 511. One such carrier may be in the form of a CD ROM disc. It may be however feasible with other data carriers such as a memory stick. The computer program code may furthermore be provided as pure program code on a server and downloaded to the first node 511.

The first node 511 may further comprise a memory circuit 907 comprising one or more memory units. The memory circuit 907 may be arranged to be used to store data such as, the information obtained, determined, received, sent, signalled or adapted by the processing circuit 906 in relation to applications to perform the methods herein when being executed in the first node 511. Memory circuit 907 may be in communication with the processing circuit 906. Any of the other information processed by the processing circuit 906 may also be stored in the memory circuit 907.

In some embodiments, information such as information from the second or third nodes 512, 513 may be received through a receiving port 908. In some embodiments, the receiving port 908 may be, for example, connected to the one or more antennas in the first node 511. In other embodiments, the first node 511 may receive information from another structure in the wireless communications network 500 through the receiving port 908. Since the receiving port 908 may be in communication with the processing circuit 906, the receiving port 908 may then send the received information to the processing circuit 906. The receiving port 908 may also be configured to receive other information.

The information obtained, determined, received, sent, signalled or adapted by the processing circuit 906 in relation to, the information related to the guard band used or required in the radio spectrum used by the second node 512, may be stored in the memory circuit 907 which, as stated earlier, may be in communication with the processing circuit 906 and the receiving port 908.

The processing circuit 906 may be further configured to send or signal information, such as information on capability to handle the information related to the guard band, to the second node 512 or to the third node 513, through a sending port 909, which may be in communication with the processing circuit 906, and the memory circuit 907.

Those skilled in the art will also appreciate that the obtaining circuit 901, the adapting circuit 902, the signalling circuit 903, the receiving circuit 904 and the sending circuit 905 described above may refer to a combination of analog and digital circuits, and/or one or more processors configured with software and/or firmware (e.g., stored in memory) that, when executed by the one or more processors such as the processing circuit 906, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
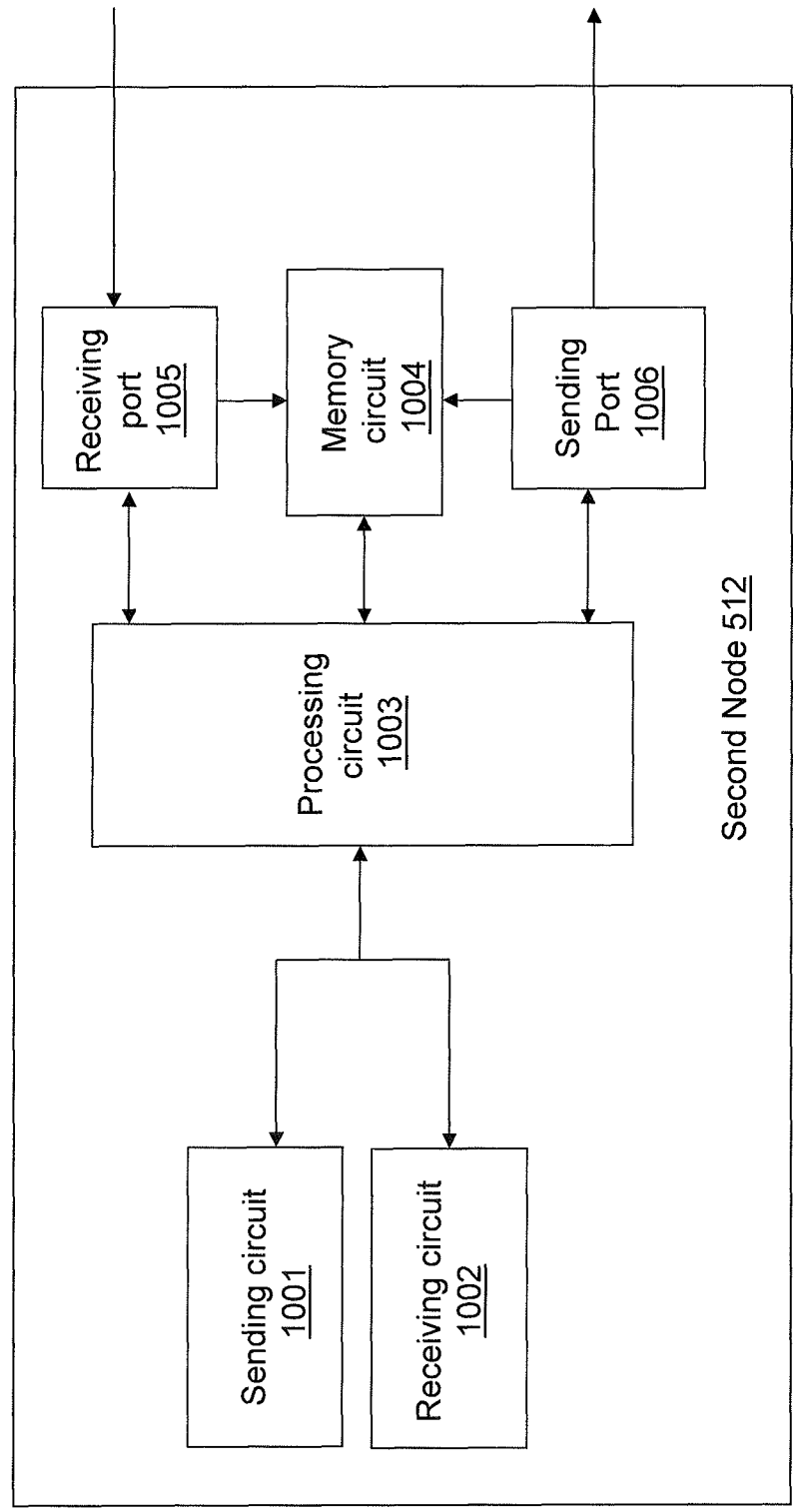
FIG. 10 is a block diagram of a second node that is configured according to some embodiments.

To perform the method actions in the second node 512 described above in relation to FIG. 7 for handling information related to a guard band used or required in a radio spectrum in a wireless communications network 500, the second node 512 comprises the following arrangement depicted in FIG. 10. The second node 512 is adapted to be comprised in the wireless communications network 500.

The detailed description of some of the following corresponds to the same references provided above, in relation to the actions described for the first node 511, and will thus not be repeated here. For example, each one of these components of the guard band is described below under the subheading "GUARD BAND CONFIGURATION".

Any of the first node 511, the second node 512 or the third node 513 may be one of: a first radio node 514, a second radio node 515, a network node 516, or a wireless device 531, 532.

The second node 512 comprises a sending circuit 1001 configured to send information to a first node 511 or a third node 513, the first node 511 and the third node 513 being comprised in the wireless communications network 500, the information being related to the guard band used or required in the radio spectrum used by the second node 512.

In some embodiments, the guard band may comprise an unused spectrum or a spectrum with restricted operation.

In some embodiments, the information related to the guard band may be pre-defined or configurable, wherein, when the information related to the guard band is configurable, it is configurable by one of: the first node 511, the second node 512 and the third node 513.

In some embodiments, the information related to the guard band may comprise at least one of: an indication of activation/deactivation of the guard band, band information of a band for which the guard band applies, co-existence scenario in which the guard band applies, duplex mode of operation in which the guard band applies, frequency-domain resources associated with the guard band, applicable node, time-domain resources or parameters associated with the guard band, power restriction that applies for the guard band, and geographical area or location where the guard band is applicable.

In some embodiments, the sending circuit 1001 may be further configured to execute the sending upon request or indication by one of the first node 511 or the third node 513 in the wireless communications network 500, or by proactive reporting by the second node 512.

In some embodiments, the second node 512 may also comprise a receiving circuit 1002 configured to receive a request from the first node 511 or the third node 513 to send the information related to the guard band used or required in the radio spectrum used by the second node 512.

In some embodiments, the receiving circuit 1002 may be further configured to receive information on a capability to handle the information related to the guard band from at least one of: the first node 511, when the first node 511 is a radio node, such as the first radio node 514, the second radio node 515, the first wireless device 531, and the second wireless device 532, and the third node 513, when the third node 513 is a radio node, such as the first radio node 514, the second radio node 515, the first wireless device 531, and the second wireless device 532.

In some embodiments wherein the second node 512 is a radio node, such as the first radio node 514, the second radio node 515, the first wireless device 531, and the second wireless device 532, the sending circuit 1001 may be further configured to send information on capability to handle the information related to the guard band to at least one of: the first node 511 and the third node 513.

In some embodiments, the capability to handle the information related to the guard band may comprise capability to create a guard band according to at least one of: pre-defined rules and received instructions from the first node 511.

The embodiments herein for handling information related to a guard band used or required in a radio spectrum in a wireless communications network 500 may be implemented through one or more processors, such as a processing circuit 1003 in the second node 512 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the second node 512. One such carrier may be in the form of a CD ROM disc. It may be however feasible with other data carriers such as a memory stick. The computer program code may furthermore be provided as pure program code on a server and downloaded to the second node 512.

The second node 512 may further comprise a memory circuit 1004 comprising one or more memory units. The memory circuit 1004 may be arranged to be used to store data such as, the information determined, received, sent, or adapted by the processing circuit 1003 in relation to applications to perform the methods herein when being executed in the second node 512. Memory circuit 1004 may be in communication with the processing circuit 1003. Any of the other information processed by the processing circuit 1003 may also be stored in the memory circuit 1004.

In some embodiments, information from the first or third nodes 511, 513 may be received through a receiving port 1005. In some embodiments, the receiving port 1005 may be, for example, connected to the one or more antennas in the second node 512. In other embodiments, the second node 512 may receive information from another structure in the wireless communications network 500 through the receiving port 1005. Since the receiving port 1005 may be in communication with the processing circuit 1003, the receiving port 1005 may then send the received information to the processing circuit 1003. The receiving port 1005 may also be configured to receive other information.

The information received or sent by the processing circuit 1003 in relation to, the information related to the guard band used or required in the radio spectrum used by the second node 512, may be stored in the memory circuit 1004 which, as stated earlier, may be in communication with the processing circuit 1003 and the receiving port 1005.

The processing circuit 1003 may be further configured to send or signal information, such as information on capability to handle the information related to the guard band, to the first node 511 or to the third node 513, through a sending port 1006, which may be in communication with the processing circuit 1003, and the memory circuit 1004.

Those skilled in the art will also appreciate that the sending circuit 1001 and the receiving circuit 1002 described above may refer to a combination of analog and digital circuits, and/or one or more processors configured with software and/or firmware (e.g., stored in memory) that, when executed by the one or more processors such as the processing circuit 1003, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 11:
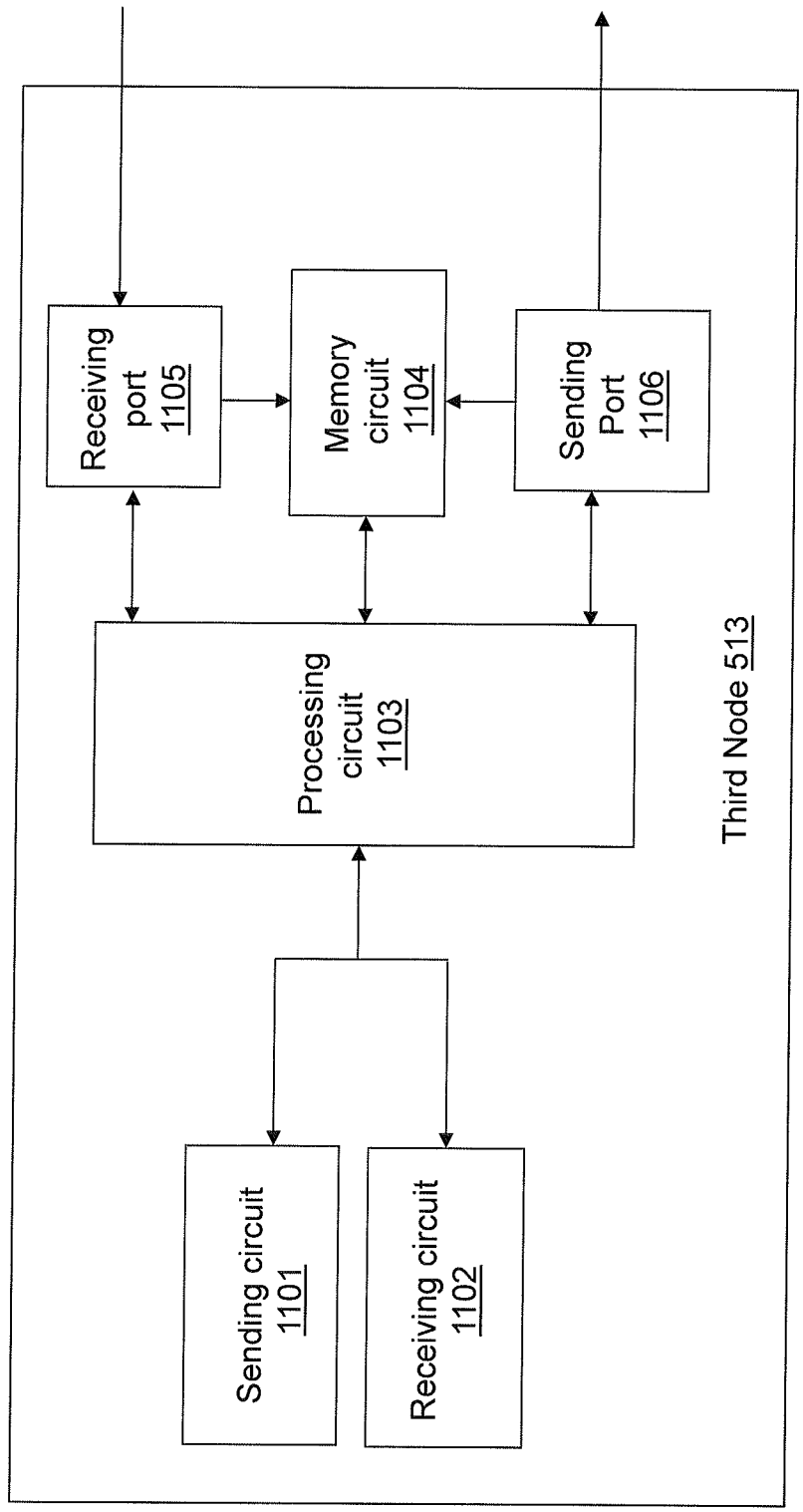
FIG. 11 is a block diagram of a third node that is configured according to some embodiments.

To perform the method actions in the third node 513 described above in relation to FIG. 8 for handling information related to a guard band used or required in a radio spectrum in a wireless communications network 500, the third node 513 comprises the following arrangement depicted in FIG. 11. The third node 513 is adapted to be comprised in the wireless communications network 500.

The detailed description of some of the following corresponds to the same references provided above, in relation to the actions described for the first node 511, and will thus not be repeated here. For example, each one of these components of the guard band is described below under the subheading "GUARD BAND CONFIGURATION".

Any of the first node 511, the second node 512 or the third node 513 may be one of: a first radio node 514, a second radio node 515, a network node 516, or a wireless device 531, 532.

The third node 513 comprises an sending circuit 1101 configured to send information to the first node 511 in the wireless communications network 500, the information being related to the guard band used or required in the radio spectrum used by the second node 512 in the wireless communications network 500.

In some embodiments, the guard band may comprise an unused spectrum or a spectrum with restricted operation.

In some embodiments, the information related to the guard band may be pre-defined or configurable, wherein, when the information related to the guard band is configurable, it is configurable by one of: the first node 511, the second node 512 and the third node 513.

In some embodiments, the information related to the guard band may comprise at least one of: an indication of activation/deactivation of the guard band, band information of a band for which the guard band applies, co-existence scenario in which the guard band applies, duplex mode of operation in which the guard band applies, frequency-domain resources associated with the guard band, applicable node, time-domain resources or parameters associated with the guard band, power restriction that applies for the guard band, and geographical area or location where the guard band is applicable.

In some embodiments, the third node 513 may also comprise a receiving circuit 1102 configured to receive the guard band related information from the first node 511.

In some embodiments, the sending circuit 1101 may be further configured to send a request to the second node 512 to send information related to a guard band used or required in the radio spectrum used by the second node 512, to the first node 511.

In some embodiments, the receiving circuit 1102 may be further configured to receive information on capability to handle the information related to the guard band from at least one of: the second node 512, when the second node 512 is a radio node, such as the first radio node 514, the second radio node 515, the first wireless device 531, and the second wireless device 532, and the first node 511, when the first node 511 is a radio node, such as the first radio node 514, the second radio node 515, the first wireless device 531, and the second wireless device 532.

In some embodiments wherein the third node 513 is a radio node, such as the first radio node 514, the second radio node 515, the first wireless device 531, and the second wireless device 532, the sending circuit 1101 may be further configured to send information on capability to handle the information related to the guard band to at least one of: the second node 512 and the first node 511.

In some embodiments, the capability to handle the information related to the guard band may comprise capability to create a guard band according to at least one of: pre-defined rules and received instructions from the first node 511.

The embodiments herein for handling information related to a guard band used or required in a radio spectrum in a wireless communications network 500 may be implemented through one or more processors, such as a processing circuit 1103 in the third node 513 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the third node 513. One such carrier may be in the form of a CD ROM disc. It may be however feasible with other data carriers such as a memory stick. The computer program code may furthermore be provided as pure program code on a server and downloaded to the third node 513.

The third node 513 may further comprise a memory circuit 1104 comprising one or more memory units. The memory circuit 1104 may be arranged to be used to store data such as, the information requested, received, sent, or adapted by the processing circuit 1103 in relation to applications to perform the methods herein when being executed in the third node 513. Memory circuit 1104 may be in communication with the processing circuit 1103. Any of the other information processed by the processing circuit 1103 may also be stored in the memory circuit 1104.

In some embodiments, information from the first or second nodes 511, 512 may be received through a receiving port 1105. In other embodiments, the third node 513 may receive information from another structure in the wireless communications network 500 through the receiving port 1105. Since the receiving port 1105 may be in communication with the processing circuit 1103, the receiving port 1105 may then send the received information to the processing circuit 1103. The receiving port 1105 may also be configured to receive other information.

The information received or sent by the processing circuit 1103 in relation to, the information related to the guard band used or required in the radio spectrum used by the second node 512, may be stored in the memory circuit 1104 which, as stated earlier, may be in communication with the processing circuit 1103 and the receiving port 1105.

The processing circuit 1103 may be further configured to send or signal information, such as information on capability to handle the information related to the guard band, to the first node 511 or to the second node 512, through a sending port 1106, which may be in communication with the processing circuit 1103, and the memory circuit 1104.

Those skilled in the art will also appreciate that the sending circuit 1101, and the receiving circuit 1102 described above may refer to a combination of analog and digital circuits, and/or one or more processors configured with software and/or firmware (e.g., stored in memory) that, when executed by the one or more processors such as the processing circuit 1103, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Generalizations

The following Generalizations apply to all the text comprised in the Detailed Description herein, as well as in the associated Claims, Figures and Summary sections.

A wireless communications system herein, such as wireless communications network 500, refers to any system capable of sending and/or receiving wireless signals, e.g., a cellular, radio or satellite system. In a co-existence scenario a wireless communications system may be called a victim (e.g., system subjected to interference) or an aggressor system (e.g., system causing interference). A victim or an aggressor system may comprise all or a subset of radio nodes of a radio network. In another example, a victim or an aggressor system may comprise all or a subset of UEs communicating to the respective radio network. Any reference to a wireless communications system herein, is to be understood to apply to wireless communications network 500.

A guard band used herein may be interchangeably named e.g. a protection band. A guard band may be configured (reserved) statically, semi-statically, or dynamically.

A wireless device, such as the first wireless device 531 and the second wireless device 532, and UE are used interchangeably in the description. Any reference to a wireless device (or UE) herein, is to be understood to apply to any of the first wireless device 531 and the second wireless device 532. A User Equipment (UE) may comprise any device equipped with a radio interface and capable of at least generating and transmitting a radio signal to a radio network node. In some embodiments, radio network nodes, such as a femto BS (e.g., home BS), may also be equipped with a UE-like interface.

A radio network node herein, such as the first radio node 514 and the second radio node 515 depicted in FIGS. 5a-d, may comprise a radio node operating or at least transmitting RF signals to a UE or performing UL measurements in one or more frequencies, carrier frequencies or frequency bands. Any reference to a radio network node herein, is to be understood to apply to any of the first radio node 514 and the second radio node 515. The radio network node may be a radio node capable of carrier aggregation (CA). The radio network node may be a single- or multi-RAT or multi-standard node, e.g., using the same or different base band modules for different RATs. Some examples of radio nodes are radio base stations (e.g., eNodeB in LTE), a measurement unit performing measurements on Uplink (UL) signals (e.g., Location Measurement Unit (LMU) for positioning) and/or Downlink (DL) signals, a radio node transmitting DL signals (e.g., beacon devices) and/or UL signals, relays, mobile relays, repeaters, sensors, etc.

Typically a radio node has an associated cell, such as the first cell 521 and the second cell 522, or creates one or more of own cells. However, a radio node may operate without creating its own cell, e.g., a measurement unit or a node receiving signals such as a relay or repeater. The radio node (e.g., eNodeB, RRU, relay, etc.) may share a cell Identifier (ID) with another radio node (e.g., eNodeB, RRU, relay, etc.).

A cell serving a UE is the serving cell for that UE. Multiple serving cells are possible with carrier aggregation, so "a serving cell" is in general referred to herein for CA and non-CA systems. With CA, a primary cell (PCell) is one example of a serving cell, while another example is a secondary cell (SCell).

The term "centralized network management node" or "coordinating node" used herein is a network node, such as the network node 516 depicted in FIGS. 5a-d, which may also be a radio network node, which coordinates radio resources with one or more radio network nodes and/or UEs. Some examples of the coordinating node are network monitoring and configuration node, Operations Support System (OSS) node, Operations & Maintenance (O&M) node, MDT node, SON node, positioning node, a gateway node such as Packet Data Network Gateway (P-GW) or Serving Gateway (S-GW) network node or femto gateway node, a macro node coordinating smaller radio nodes associated with it, etc.

A radio node may be a radio network node (e.g. eNode B, base station, relay, LMU etc) or a UE. Any reference to a radio node herein, is to be understood to apply to any of the first wireless device 531, the second wireless device 532, the first radio node 514 and the second radio node 515, unless otherwise noted.

A network node used herein, such as the first radio node 514, the second radio node 515, and the network node 516 depicted in FIGS. 5a-d, may refer to a radio node (as described above, such as the first radio node 514 and the second radio node 515 depicted in FIGS. 5*a-d*, and such as the first wireless device 531 and the second wireless device 532 depicted in FIGS. 5*a-d*), a radio network node in general (e.g., Radio Network Controller—RNC), a core network node or any node in the network (e.g., positioning node (e.g., Evolved Serving Mobile Location Centre—E-SMLC or SLC), MDT node, O&M, SON node, a gateway node, Mobility Management Entity—MME, any coordinating node, such as the network node 516 depicted in FIGS. 5*a-d*, etc.). Any reference to a network node herein, is to be understood to apply to any of the first wireless device 531, the second wireless device 532, the first radio node 514, the second radio node 515, and the network node 516, unless otherwise noted.

The term signaling used herein can refer to direct links or logical links (e.g. via higher layer protocols and/or via one or more network nodes, radio nodes or UEs). It may mean signaling via radio links and/or fixed connection. For example, signaling from a coordinating node may pass another network node, e.g., a radio node. The signaling from one radio node to another radio node may also comprise signaling via user equipment or another radio node or another network node.

Although various embodiments are described in the context of 3GPP LTE, the invention is not limited thereto. An aggressor or a victim system may be a cellular network system, a satellite system (e.g., Global Positioning System (GPS), Global Navigation Satellite System (GNSS), etc.), an ad hoc network, a sensor network, or any wireless communications in general. A wireless communications system may also comprise any Radio Access Network (RAN), single- or multi-RAT. A RAT may be configured to comply with one or more of the standards: LTE, LTE-Advanced, UMTS, GSM, Code Division Multiple Access 2000 (cdma2000), Worldwide Interoperability for Microwave Access (WiMAX), and WiFi.

The various embodiments described herein may be considered as independent embodiments, or two or more embodiments may be combined with each other.

Guard Band Related Information

The guard-band related information referred herein may comprise the information describing guard band configuration and information associated with a guard band.

One or more parameters or information associated with the guard band described below, in the Guard Band Configuration section, may be:
 provided by pre-defined mechanisms;
 provided by dynamically mechanisms controlled by a network node; and/or
 provided by a combination of pre-defined and dynamically controllable mechanisms.

The parameters associated with the guard band may be configured by an x node or by a y node or via coordination between at least two nodes (e.g., two eNBs in adjacent band by coordinating with each other decide to configure half a guard band each), such as described below:
 The x node can be the node where the guard band is created e.g. any radio node, eNode B, base station, relay, access point, LMU, etc.
 The y node can be another node which may request the x node to configure the guard band. The configuration herein refers to creation, modification, extension or reduction of the guard band.
 The y node may be, e.g., a coordinating node.

In all the three cases mentioned above (i.e. pre-defined, configurable, or combination of pre-defined and configurable parameters associated with guard band), according to some embodiments, at least certain aspects or parameters associated with the guard band information are exchanged between the network nodes. For example, when the parameters are pre-defined the y node may send an indication to the x node requesting to activate the guard band according to the pre-defined settings and parameters.

Guard Band Configuration

Guard band configuration signaling is communication from an x node to a y node, and may be further communicated from the y node to the x node. The guard band configuration signaling conveys information that can include at least one of, or a combination of:

1) An indication of activation/deactivation of the guard band, which can include:
 A binary indicator (ON/OFF);
 An activation indicator with a limited time period (configured or pre-defined); and/or
 A de-activation indicator with a limited time period (configured or pre-defined).

2) Band information of band for which guard band applies, which can include:
 Band indicator or identifier of a frequency band for which the guard band applies such as band 7; and/or
 Any frequency band which is in certain frequency range e.g. 1900-2200 MHz or 2500-2600 MHz etc.

3) Co-existence scenario in which guard band applies. Some example co-existence scenarios are given below; guard band applies when:
 Band A and band B co-exist in same region or geographical area e.g. band 7 and band 38;
 FDD band and TDD band are adjacent or are very close in frequency domain;
 Certain band A and certain systems (e.g. public safety, radar, etc.) co-existence in the same region in adjacent spectrum or are very close in frequency domain; and/or
 Unsynchronized TDD operation e.g. unsynchronized operation in adjacent TDD carriers or in carriers in adjacent bands or close in frequency domain. Unsynchronized operation means the TDD carriers may have different subframe timing and/or frame timing and/or use different TDD configurations. TDD configuration may comprise of UL-DL subframe/slot configuration and/or special subframe configuration etc.

4) Duplex mode of operation in which guard band applies; for example, guard band applies when a radio node operates:
 In full duplex FDD mode;
 In half or full duplex FDD;
 In TDD;
 In receive mode only;
 In transmit mode only; or
 In any mode.

5) Frequency-domain resources associated with the guard band, which can include:
 Location (absolute or relative) in frequency domain associated with the guard band, which can include:
  A center frequency of the guard band; and/or
  A frequency offset from a known frequency (e.g., center frequency of the system bandwidth, center frequency of the measurement bandwidth, carrier component frequency, etc.).
 Bandwidth of the guard band;
 Bandwidth of each part of the guard band e.g. Band Width (BW) of guard band at the lower and upper edges of the band;

A set of pre-defined frequency-domain resources (e.g., a number or a set of resource blocks, subcarriers, etc.); and/or An indication of the symmetry of the guard band (e.g., lower part of the frequency band, upper part of the frequency band, both lower and upper parts).

6) Applicable node; whether the guard band is to be created by:

Radio network node (e.g. eNode B) only;
UE only; and/or
Radio network node as well as UE e.g. default settings.

7) Applicable direction of guard band; whether the guard band is to be created for signal transmission in particular direction (DL or UL) or both. For instance guard band applies to:

Uplink direction, which can include Uplink carrier frequency in FDD or in half duplex FDD or uplink slot/subframe in TDD systems;

Downlink direction, which can include downlink carrier frequency in FDD or in half duplex FDD or downlink slot/subframe in TDD; and/or In both directions, e.g. default settings.

8) Time-domain resources or parameters associated with the guard band, may comprise one or more of the following:

A time period during which the guard band applies (e.g., a subframe, a sequence or a set of subframes, a radio frame, a time period during a day, etc.), A time from when the guard band applies (e.g., slot X, subframe X, frame X, an offset from a pre-defined or configured time, etc.), Persistence type or level, which can include:
Aperiodic e.g. once over an indicated time period or upon a certain condition or event, occasional, etc; and/or
Periodic or recurrent, where the associated parameter may be periodicity in time with which guard band recurs.

9) Power restriction that applies for the guard band, which can include:

Power restriction type, e.g., no transmit power, limited output power, etc.

Maximum allowed transmit output power in guard band in case limited output power is allowed, where:
The parameter can be different for UE and for radio network node
The parameter can also be defined as:
Absolute power restriction: For example it may be expressed that max X dBm transmit power is allowed; and/or
Relative power restriction: For example the maximum allowed power as a function of a reference value. The reference value can be maximum output power or a declared or rated maximum output power level. For example it may be expressed as Y=40 dB lower than Maximum output Power (Pmax) for BS and Z=30 dB lower than Pmax for UE.

10) Geographical area or location where guard band is applicable. The UE may determine own location or receive it from the network node or from another UE. The UE location may be determined by the network node or UE based on one or positioning methods such as GPS, Assisted GPS (A-GPS), Observed Time Difference Of Arrival (OTDOA), proximity location, Uplink-Time Difference of Arrival (UTDOA), Enhanced Cell IDentifier (E-CID), etc. The UE may determine its relative location based on signal measurements. For example, it may be expressed in terms of one or more of:

Set of geographical coordinates (e.g., within a circle centered at some (x,y), sphere centered at some (x,y,z), an area described by a polygon with more than vertices, etc.);

Up to certain distance from a reference location e.g. from certain base station or from serving base station for UE;

Name or identity of an area e.g. name of the district, city, area surrounding a sensitive location such as airport, hospital, nuclear installation, security establishment, etc;

Height up to which or above which guard band is applicable e.g. it may not be applicable in very high rise buildings above certain floor, etc; and/or An area determined by a condition specified with respect to one or more signal measurements, which can include:
when a certain received signal (e.g., of a closest BS, of a given BS, or of any UE, etc.) is above a threshold;
when a timing measurement indicates proximity to a radio network node or UE; and/or
when total received interference is high.

At least some of the guard band information above may be specified as a pre-defined rule, e.g., time-domain resources (e.g., always ON or certain subframes ON) or power restriction (e.g., no transmissions).

The configured guard bands may be symmetric (e.g., same size, at both ends of the carrier bandwidth or system bandwidth) or asymmetric (e.g., from one side of the system bandwidth side only).

A guard band is typically configured in the aggressor system, but it may also be configured in the victim system, or it may be configured in both aggressor and victim systems, e.g., shared when each system configures a smaller guard band.

Guard Band Handling Capability

All radio nodes may or may not be capable of handling guard band related information. For example all radio nodes may not be capable of dynamically or semi-statically creating a guard band based on received information or based on pre-defined rules. Therefore a radio node may also indicate its capability in terms of handling the guard band configuration information for creation of a guard band to another node.

A radio node may be a radio network node (e.g. eNode B, base station, relay, LMU etc) or a UE.

The target network node receiving the capability may be a radio network node (e.g. neighboring radio node such as eNode B, serving radio node serving UE, relay etc) or a network node (e.g. core network node, a coordinating node, positioning node, etc).

In another embodiment, the target node may also be a UE, when another UE signals its or other radio node's capability. In this embodiment, the target and the source UEs communicate directly.

In general a radio node may signal its 'guard band handling' capability to the target network node indicating that it is capable of creating a guard band according to the received instructions and/or when one or more pre-defined rules or conditions are fulfilled. The guard band capability may also comprise additional information. The guard band capability is described below with a few specific examples.

In one example, the radio node may not be capable of handling any guard band related configuration information described in the previous section entitled Guard Band Configuration.

In another example the radio node may be capable of handling only partial or subset of the guard band related configuration information described above. For example a radio node may be capable of creating aperiodic guard band (i.e. only once) with no transmission (i.e. 0 watt power). Yet another radio node may be capable of creating guard band only periodic or aperiodic with no transmission or with low power transmission.

In another example the radio node may be capable of handling a guard band for certain frequency band, co-existence scenario, in particular duplex mode, etc.

In another example, the radio node may be capable of handling a guard band based on the location or geographical area information (such as defined above in the Guard Band Configuration section).

In yet another example the radio node may be fully capable of handling all the guard band related configuration information described above.

Methods of Obtaining the Guard Band Related Information

The guard band related information described above in the Guard Band Configuration section (including guard band capability) may be obtained or determined by a node according to one or more of the following processes:

Explicitly, for example, by receiving signaling from another node;
Implicitly, for example, by autonomous determination; or
A combination of explicit and implicit processes, e.g. part of information is obtained by explicit signaling whereas remaining one is determined implicitly.

The obtaining or determination or acquisition of the information may be performed by a node which may be a UE or a network node (e.g., eNodeB, a core network node, MME, or a controlling node). The node may belong to an aggressor system or victim system. The autonomously obtained information may also be signaled to UE or another node or used internally in the UE or node where the information was obtained.

The three different approaches of obtaining the said information are described in the following sections:

Approach 1: Explicit Approach for Obtaining Guard Band Related Information

The guard band related information may comprise any guard band related information described above in the Guard Band Related Information section. The information is obtained by a node from another node via explicit signaling.

The guard band related information may be sent between two network nodes (i.e., from an x network node to a y network node and/or from the y network node to the x network node, by one or more of the following processes:

x and y network nodes are radio nodes (e.g., eNodeBs receiving the information via radio interface, via X2, via another node or UE in a transparent container);
x node is a radio node (e.g., eNodeB), y node is a radio network node (e.g., RNC);
x node is radio network node (e.g., RNC), y node is network node (e.g., a core network node);
x node is radio node (e.g., eNodeB), y node is a core network node (e.g., positioning node, O&M, SON node, MDT node, etc.); and/or
x and y network nodes are core network nodes (e.g., SON node and O&M node, positioning node and O&M node, MME and MDT, etc.).

Alternatively, the guard band related information may be sent from a wireless device to a network node, by the following process:

x node is UE, y node is radio node (e.g., eNodeB); or
x node is UE, y node is network node (e.g., positioning node).

Alternatively, the guard band related information may be sent between two wireless devices, by the following process:

Via a direct wireless interface;
Via a direct cable connection;
Via at least one network node; and/or
Via another wireless device.

The information may be sent in a unicast (point-to-point) manner, multicast or broadcast.

Signaling Events

A node may signal its guard band related information to another node. For example, the second node 512 may signal its guard band related information to the first node 511 or the third node 513. In another example, the first node 511 may signal the obtained guard band information to the second node 512 or the third node 513. This may happen in one or more of the following approaches:

1) Proactive reporting without receiving any explicit request from another node, such as the third node 513, or the first node 511; another node is the one receiving the said information or yet another node that does not receive the information; and/or
2) Reporting upon receiving an explicit request from the another node or a third node, such as the third node 513 (e.g., eNodeB requesting UE to send the information to positioning node; positioning node's message triggers the UE to send the information to eNodeB; one eNodeB's message triggers the UE to send the information to another eNodeB).

In case of proactive reporting, the node may report its guard band related information during one or more of the following events:

For a UE:
During initial setup or session setup for a specific service or call setup applicable to UE e.g. when establishing the RRC connection or setting up a positioning session;
During cell change e.g. handover, RRC re-establishment, RRC connection release with re-direction, PCell change or PCC change in multi-carrier system, primary link or primary cell change in CoMP or multi-point transmission/reception etc; and/or
Periodic reporting For a network node:
During initial setup of a network node;
During a session setup for a specific service;
When a network node is modified e.g. upgraded with new features such as new bands, modification of RF components, etc;
When one or more network parameter or network configuration is changed e.g. new nodes or systems are deployed in the network; and/or
Periodic reporting In case of reporting upon a request from another node, the request sent by the other node may comprise of any one or a combination of:

an indication for the need for such information;
periodicity of delivery of such information;
requested details of the information (e.g., any information from the guard band information configuration described above in the Guard Band Related section); and/or
one or more conditions under which the information is to be delivered such as a threshold (e.g., for a performance characteristic, signal strength, signal quality, statistics over more than wireless connections, number of failures), etc. For example if signal quality measured by a radio node falls below a certain threshold then it may signal its guard band related information to neighboring nodes. The node signaling the guard band related information to another node may also signal the conditions (e.g. associated identifier or event ID, etc.) triggering the reporting of guard band.

The request may be sent from a UE or a network node to another UE or another network node.

Approach 2: Implicit Method of Obtaining Guard Band Related Information

In one embodiment, the guard band related information may be obtained implicitly by UE or a network node in case there is no explicit means to acquire the said information. More specifically a radio node (e.g. UE or a radio network node) may autonomously determine whether a guard band is currently used or implemented on one or more carrier frequencies by other nodes operating in the network. The carrier frequency may be serving carrier frequency, adjacent carrier or any other carrier. The non-serving carrier may belong to the frequency band of the serving carrier or of another frequency band. The autonomous determination of guard band may be done separately for uplink and downlink.

In order to explicitly determine whether guard band is currently used or not on a certain carrier the radio node may utilize one or more of the following mechanisms:

Measurement of signals or total interference; and/or
Sensing of signals.

In either of the approaches, one or more nodes may also collect and/or store and/or exchange the statistics of measurements or observations.

In the first mechanism, the radio node deliberately performs one or more measurements on signals transmitted on a carrier. The measurements can be performed on uplink and/or downlink signals. Examples of measurements are signal strength, signal quality, total received power (e.g. Received Signal Strength Indicator (RSSI), Channel State Information (CSI) etc. The radio node may perform such measurements over the entire carrier or over certain part of the carrier (e.g. at the lower 1-5 MHz and/or upper 1-5 MHz of the carrier or at the center 1-5 MHz of the carrier). The radio node may also compare the measurement results obtained over different parts of the carrier. For example, if the comparison of the measurement results indicates an absence of signal or if the measurement value is very low in certain part of the carrier, then the radio node may assume that this is due to the guard band.

In the second mechanism, the radio node does not actively perform measurements on certain carrier. Rather it observes (i.e., senses) whether there is an activity (e.g. transmission and/or reception of signals) or not in certain part of a carrier. Based on this observation the radio node determines whether a guard band is used or not on a certain carrier. For example a UE may observe that its serving radio node never schedules any UE over certain part of a carrier frequency. The UE may use this statistics to determine whether a guard band is used or not in certain part of this carrier. Similarly a radio network node may receive certain measurement results from neighboring radio network nodes (e.g. eNB receiving results from its neighboring eNBs over X2 interface). The receiving radio network node may use the received measurements for determining the use of guard band at the radio network node(s) sending the measurements. Examples of measurements are channel usage or more specifically resource block usage in LTE etc. If the resource block usage in certain part of the carrier is consistently or over a certain time below a threshold then the receiving node may assume that guard band is used in that part of the carrier.

In order to confirm that the autonomously determined guard band is correct and authentic, the radio node determining the guard band may signal this information or an indication to nodes, whose guard band is determined. In response, the nodes may send an indication whether the determination or correct or not. The radio node autonomously determining the guard band may also signal the determined guard band related information to other neighboring nodes.

Approach 3: Combination of Explicit and Implicit Method of Obtaining Guard Band Related Information The combined method uses both explicit and implicit principles described in previous sections to determine the information related to the guard band used by a radio node on certain carrier.

The explicit means may provide some coarse information related to the guard band to the radio node. For example, the coarse information may comprise of frequency band, coexistence scenario, geographical coordinates, maximum power reduction, etc.

The implicit means may be used by the radio node to precisely determine guard band related information, e.g., carrier frequency and part of carrier frequency which comprises of guard band. The node may also use the coarse information related to the guard band for reducing the number of hypothesis in determining the guard band more precisely.

The radio node determining the guard band based on the combined method may also signal the determined guard band related information to other neighboring nodes.

Methods and Operations for Using the Guard Band Related Information in a Network A node which obtains the guard band information may use the obtained guard band information for adaptation of one or more procedures related to the radio operation.

A node can be a radio node, which in turn may be a UE or a radio network node. A node may also be a network node such as SON node, MDT node, OSS node, O&M node, network monitoring node, core network node, positioning node, etc.

Examples of radio operations, which may be adapted by the relevant node, in response to the said obtained information are:

Adaptation of measurement procedures;
Adaptation of mobility procedures;
Adaptation of resource assignment and scheduling procedures;
Adaptation of requirements;
Adaptation of monitoring of the network performance; and
Adaptation of radio network planning procedures.

The above operations are described in the following sections in more detail by means of specific examples.

Adaptation of Measurement Procedures

A node may adapt or modify one or more measurement procedure especially related to neighbor cell measurements or related to measurements which incorporate signals belonging to one or more neighbor cells. The measurement procedure may be related to any type of measurements. The measurements may be performed by the UE or by the radio node. Examples of measurement types are mobility measurements, positioning measurements, interference management related measurements (e.g. aka Enhanced Inter-Cell Interference Coordination (eICIC) measurements), load measurements, MDT measurements, SON measurements, etc.

The adaptation of measurement procedure means that the UE and/or network node may use a specific set of one or more parameters, which are suitable when guard band is used in other nodes. For example, when the first radio network node (e.g. eNode B) is informed by one or more neighboring eNodeBs that they use 20 MHz carrier frequency at the edge of the frequency band but employ certain guard band (e.g. 5 MHz guard band at both edges of a TDD band). This means effective carrier frequency is only 15 MHz. In response the first radio network node may adapt measurement bandwidth parameter not larger than 15 MHz. The measurement bandwidth is signaled to UE for doing DL neighbor cell measurement. Similarly, in this example, the first radio node (i.e. eNode B) may perform load measurement on UL received signal over the carrier frequency but only over 15 MHz instead of 20 MHz. This will ensure that the first radio node is able to accurately determine the actual uplink interference or load since transmissions in neighbor cells are not allowed at the edge of the frequency band.

Similarly, the positioning node may adapt the Positioning Reference Signals (PRS) bandwidth parameter to account for the guard band used in the neighboring eNodeBs. The PRS bandwidth parameter is signaled to the UE in the positioning assistance data. The parameter is used by the UE for performing Reference Signal Time Difference (RSTD) measurements. Therefore the adapted PRS parameter will be used by the UE for doing the RSTD measurements and will thus ensure that UE measures RSTD over the valid transmitted PRS signals from the neighboring cells.

The serving network node may also adapt one or a plurality of higher layer parameters associated with measurements when guard band is used in part of the spectrum where one or more measurements are to be performed by the UE. The spectrum where measurements may be performed may comprise one or more carrier frequencies in the frequency band where guard band is used or one or more carrier frequencies in the frequency band which adjacent to a band where guard band is used. Examples of higher layer parameters associated with the measurements to be adapted include time domain layer 3 filtering coefficient, time to trigger, periodicity of measurement reporting, measurement bandwidth, etc.

The network node (e.g. eNode B) may also adapt the positioning related parameters such as number of PRS subframes in a positioning occasion, periodicity of positioning occasion, PRS transmission bandwidth, PRS transmit power, etc. The adaptation due to the guard band may be done autonomously by the eNode B or upon receiving a request from other nodes. The other nodes may be a positioning node, MDT node, SON node, O&M node, OSS node, etc.

Adaptation of Mobility Procedures

The network node (e.g. serving eNode B) may take into account the guard band used in neighboring nodes when performing mobility related task such as cell change of UE. Examples of cell change operation are handover, PCell change, PCC change, RRC connection release with redirection etc. The guard band may be used on the serving carrier serving the UE or on any other carrier. The other carrier may even belong to another RAT. LTE TDD and FDD are considered to be different RATs.

For example, in case of carrier aggregation the eNode B may select PCell on a carrier which does not employ guard band or employs smallest guard band or employs guard band in least number of neighboring cells.

Similarly, for example, when performing inter-frequency handover the serving radio node may select the target carrier frequency by considering the size of the guard band used on candidate carriers. In one example the serving node may select a carrier which does not employ or which is not adjacent to a guard band. This will ensure that high data rate is achievable after the handover. In another example for the UE which uses low data rate service (e.g. speech) the radio node may select a carrier where guard band is used.

Adaptation of Resource Assignment or Scheduling Procedures

The network node (e.g. serving eNode B) may take into account the guard band used in neighboring nodes when performing resource assignment or scheduling tasks (in DL, UL or both) such as selection of carrier for admission control, selection of PCell, data scheduling, transmission configuration of specific signals and channels, etc.

For example, a radio network node may select a carrier with a small or negligible guard band for a UE which requires very high data rate. This will ensure that the UE can be assigned all or large number of channels (e.g. resource blocks etc) by the serving radio node. The UE may also be served with high data rate after cell change since neighboring cells also use smaller guard band.

The serving radio node may also avoid high power transmission in UL and/or in DL over the part of the spectrum which overlaps with the guard band used in one or more neighboring cells. To ensure this the serving radio node may limit the UL and/or DL transmit power below their respect thresholds.

Adaptation of Requirements

The UE and radio network node have to meet certain pre-defined requirements. The requirements are defined to ensure that the UE and radio network nodes correctly implement different procedures related to, e.g., interference management, measurement, mobility, resource assignment, etc. The requirements may thus comprise radio requirements, measurement requirements, accuracy requirements, performance requirements, etc. The radio requirements may further comprise receiver and/or transmitter requirements.

Upon receiving information that guard band is used in a neighboring node or on certain carrier (e.g. on an adjacent carrier or on a carrier within certain distance in frequency domain) the radio node may adapt one or more pre-defined requirements. This means the radio node may meet first set of pre-defined requirements when no guard band is used and may meet second set of pre-defined requirements when guard band is used in neighboring nodes. For example, the measurement time may be longer and/or the accuracy may be lower, when a guard band is used and less frequency resources are available for transmitting the measured signals. The second set of pre-defined requirements may also depend upon the parameters associated with the guard band (e.g. size of guard band, location of guard band, co-existence scenario, geographical location etc). For example, if there is a guard band used in an adjacent carrier then the radio node may transmit at relatively higher output power. Therefore, in this example, the second pre-defined radio requirements may be relaxed to some extent. The radio node may be a UE and/or a radio network node.

The requirements related to measurements such as measurement period, measurement accuracy, signal conditions under which requirements are applicable, etc., may also be adapted by a radio node doing measurement in case guard band is used in the neighboring nodes or on adjacent carriers or bands, etc. The adaptation may require the radio node (e.g. UE) to perform a measurement over a longer period when guard band is used. This is due to the possible reduction of signals to measure when guard band is used. Thus to achieve the desired measurement accuracy the UE may have to perform measurement over a longer measurement interval.

Monitoring of Network Performance

Any network node or radio network node may use the obtained information related to the guard band (e.g. statistics) for monitoring and observing the network performance. For example, the network nodes such as SON, OSS/O&M, MDT or even radio node (e.g. eNode B) may determine impact on capacity, the impact on user performance, overall network performance when guard band is used or when guard band is larger than certain threshold etc. The node may also assess the impact on network performance when no guard band is used or when the size of the guard band is varied.

This function may also enable the network nodes to determine the optimum size of guard band in different co-existence scenarios. The determined guard band size may also be recommended to the relevant network nodes, e.g., eNode Bs or small BSs (such as femto BSs) in that coverage area.

Radio Network Planning

The introduction of guard band may lead to apparent reduction in overall network capacity. Therefore efficient network planning is of paramount importance.

Any network node or radio network node may use the obtained information related to the guard band for planning, dimensioning, deployment and/or location of network nodes, identification of the location to deploy or modify different features such as carrier aggregation, configuration. Network configuration optimization may also be optimized automatically, e.g., involving SON node. It may also be used for setting of one or more network parameters such as carrier frequencies, bands, bandwidth selection, measurement bandwidth, setting of Discontinuous Reception (DRX) cycle length, setting of Discontinuous Transmission (DTX) cycle length etc. For example the SON node or OSS/O&M node may recommend an optimized setting of cell bandwidth and base station site locations to circumvent the reduction in spectrum due to the introduction of guard bands.

Another example is that some radio nodes may be configured by automated network optimization function to use a lower power on the entire or parts of their system bandwidth responsive to configuring guard band in at least one radio in the area. Optimization may be with respect to one of or a combination of specific objectives, e.g., maximum network capacity, energy efficiency (minimum energy consumption), etc.

Methods of Using the Guard Band Related Information in Testing Procedures

The operations and methods described herein in terms of exchanging guard band related information between the nodes and using them for one or network operational tasks can also be implemented in test equipment (TE) for testing of UE and/or network node (e.g. base station, relay etc).

The aim of the test is to verify that the relevant node (UE and/or network node) is compliant to the relevant procedures, signaling protocols and corresponding requirements described in preceding sections. The TE node, which is interchangeably called as system simulator (SS) or test system (TS), may mimic or emulate a UE or a network node.

More specifically the purpose of the test is to verify that the UE and/or network node is compliant to one or more of the following operations and methods:
- Pre-defined rules, which may define device behavior (e.g., adaptation of measurement procedures described in the Adaptation of Measurement Procedures section and/or or adaptation of resource assignment described in the Adaptation of Resource Assignment or Scheduling Procedures section);
- Procedures and methods including signaling and protocols; and/or
- Requirements which include measurement requirements, accuracy requirements, performance requirements, radio requirements, etc.

In order to perform the above testing the TE has to implement pre-defined rules, procedures, methods and interpretation of requirements described above, which are implemented by the UE and/or the network node.

Typically the TE or SS or TS separately performs tests for UE and network nodes.

The testing may also be performed separately for verifying each pre-defined rule, procedure and requirement or number of different aspects may be combined into a single test.

For UE testing, the TE or SS can also be capable of one or more of the following operations and methods:
- Configuring the UE to perform one or more measurements by adapting procedures in accordance with the rules when guard band is used in neighboring cells.
- Receiving the UE measurement results associated with the measurements when guard band is used.
- Collecting and analyzing the received results e.g. comparing the with the reference results to verify whether the UE is compliant to the procedures, pre-defined requirements etc or not. The reference can be based on the pre-defined requirements or UE behavior or theoretical estimate or performed by a reference device. The reference device can be part of TE or SS.
- In one embodiment, a new Orthogonal Frequency-Division Multiple Access (OFDMA) Channel Noise Generator (OCNG) pattern, which are applicable for the scenario when guard band is used in the network are pre-defined for the purpose of UE testing. The guard band related OCNG patterns may be used when UE is tested for verifying its compliance to the guard band related procedures, requirements etc. For example, in certain part of the guard band related OCNG pattern in time and/or in frequency domains either no power is transmitted or low power (i.e. output power below a threshold) is transmitted. The guard band related OCNG patterns may also be implemented in a radio network node (e.g. eNode B, relay etc) when UE is tested in the real or live network.

For the testing (aka conformance testing) of radio network node (e.g., eNode B, relay, base station, etc.), the TE or SS will also be capable of one or more of the following operations and methods:
- Verifying that the network node is able to receive the signaling related to guard band from other nodes;
- Verifying that the network node is able to adapt one or more procedures when guard band is used;
- Verifying that the network node is able to perform measurements in accordance with the rules when guard band is used.
- Receiving measurement results and analyzing the received results from the radio network node e.g. comparing the received results with the reference results. The reference can be based on the pre-defined requirements or eNodeB behavior or theoretical estimate or performed by a reference device. The reference device may be part of TE or SS.

ABBREVIATIONS

3GPP 3rd Generation Partnership Project
BS Base Station
CA Carrier Aggregation
CC Component carrier
CRS Cell-specific Reference Signal eICIC enhanced ICIC
eNodeB evolved Node B
E-SMLC Enhanced SMLC
ICIC Inter-Cell Interference Coordination
LTE Long-Term Evolution
OOBE Out of band emissions
PCI Physical Cell Identity
RAT Radio Access Technology
RRC Radio Resource Control
SINR Signal-to-Interference Ratio
SS System simulator
TE Test equipment
TS Test system
UE User Equipment
UMTS Universal Mobile Telecommunications System In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement functions/acts specified in the block diagrams and/or flowchart block or blocks, and thereby create means, functionality and/or structure to implement functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps to implement the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method in a first radio node for handling information related to a guard band used or required in a radio spectrum in a wireless communications network, the first radio node being comprised in the wireless communications network, the method comprising:
    obtaining information from a second radio node or a third radio node in the wireless communications network, the information indicating frequency-domain resources associated with the guard band used or required in the radio spectrum used by the second radio node, and
    adapting one or more procedures related to the radio operation within the wireless communications network, based on the information indicating frequency-domain resources associated with the guard band,
    wherein the first radio node, the second radio node and the third radio node are each configured to serve a user equipment that communicates with the wireless communications network, and
    wherein the one or more procedures comprises a cell change of a UE.

2. The method of claim 1, wherein the guard band comprises an unused spectrum or a spectrum with restricted operation.

3. The method of claim 1, wherein the information indicating frequency-domain resources associated with the guard band is pre-defined or configurable, wherein, when the information indicating frequency-domain resources associated with the guard band is configurable, it is configurable by one of: the first radio node, the second radio node, or the third radio node.

4. The method of claim 1, wherein the information related to the guard band further comprises at least one of: an indication of activation/deactivation of the guard band, band information of a band for which the guard band applies, co-existence scenario in which the guard band applies, duplex mode of operation in which the guard band applies, applicable node, time-domain resources or parameters associated with the guard band, power restriction that applies for the guard band, or geographical area or location where the guard band is applicable.

5. The method of claim 1, wherein the obtaining is executed upon request or indication by one of the first radio node or the third radio node in the wireless communications network, or by proactive reporting by the second radio node.

6. The method of claim 1, wherein the obtaining comprises the first radio node autonomously determining the information related to the guard band in the radio spectrum used by the second radio node.

7. The method of claim 6, wherein the obtaining comprises at least one of: measuring or sensing signals.

8. The method of claim 1, wherein the one or more procedures related to a radio operation within the wireless communications network further comprises one or more of: adaptation of measurement procedures, adaptation of mobility procedures, adaptation of resource assignment and scheduling procedures, adaptation of requirements, monitoring of the network performance, or radio network planning and testing procedures.

9. The method of claim 1, wherein any of the first radio node, the second radio node or the third radio node is one of: a first radio node, a second radio node, or a network node.

10. The method of claim 6, further comprising signaling autonomously obtained guard band related information indicating frequency-domain resources associated with the guard band to the second radio node or the third radio node.

11. The method of claim 1, the method further comprising:
    receiving information on capability to handle the information indicating frequency-domain resources associated with the guard band from at least one of: the second radio node, or the third radio node.

12. The method of claim 1, the method further comprising:
    sending information on capability to handle the information indicating frequency-domain resources associated with the guard band to at least one of: the second radio node or the third radio node.

13. The method of claim 1, further comprising sending a request to the second radio node to send the information indicating frequency-domain resources associated with the guard band used or required in the radio spectrum used by the second radio node.

14. A first radio node for handling information related to a guard band used or required in a radio spectrum in a wireless communications network, the first radio node being adapted to be comprised in the wireless communications network, the first radio node comprising:
    an obtaining circuit configured to obtain information from a second radio node or a third radio node in the wireless communications network, the information indicating frequency-domain resources associated with the guard band used or required in the radio spectrum used by the second radio node, and
    an adapting circuit configured to adapt one or more procedures related to the radio operation within the wireless communications network, based on the information indicating frequency-domain resources associated with the guard band,
    wherein the first radio node, the second radio node and the third radio node are each configured to serve a user equipment that communicates with the wireless communications network, and
    wherein the one or more procedures comprises a cell change of a UE.

15. The first radio node of claim 14, wherein the guard band comprises an unused spectrum or a spectrum with restricted operation.

16. The first radio node of claim 14, wherein the information indicating frequency-domain resources associated with the guard band is pre-defined or configurable, wherein, when the information indicating frequency-domain resources associated with the guard band is configurable, it is configurable by one of: the first radio node, the second radio node, or the third radio node.

17. The first radio node of claim 14, wherein the information indicating frequency-domain resources associated with the guard band further comprises at least one of: an indication of activation/deactivation of the guard band, band information of a band for which the guard band applies, co-existence scenario in which the guard band applies, duplex mode of operation in which the guard band applies, applicable node, time-domain resources or parameters associated with the guard band, power restriction that applies for the guard band, or geographical area or location where the guard band is applicable.

18. The first radio node of claim 14, wherein the obtaining circuit is further configured to execute the obtaining upon request by one of the first radio node or the third radio node in the wireless communications network, or by proactive reporting by the second radio node.

19. The first radio node of claim 14, wherein the obtaining circuit is further configured to autonomously determine the information related to the guard band in the radio spectrum.

20. The first radio node of claim 19, wherein the obtaining circuit obtains at least one of: measuring or sensing signals.

21. The first radio node of claim 14, wherein the one or more procedures related to a radio operation within the wireless communications network further comprises one or more of: adaptation of measurement procedures, adaptation of mobility procedures, adaptation of resource assignment and scheduling procedures, adaptation of requirements, monitoring of the network performance, or radio network planning and testing procedures.

22. The first radio node of claim 14, wherein any of the first radio node, the second radio node or the third radio node is one of: a first radio node, a second radio node, or a network node.

23. The first radio node of claim 19, further comprising a signaling circuit configured to signal autonomously determined information indicating frequency-domain resources associated with the guard band to the second radio node or the third radio node.

24. The first radio node of claim 14, further comprising a receiving circuit configured to receive information on capability to handle the information indicating frequency-domain resources associated with the guard band from at least one of: the second radio node, or the third radio node.

25. The first radio node of claim 14, wherein the first radio node further comprises a sending circuit configured to send information on capability to handle the information indicating frequency-domain resources associated with the guard band to at least one of: the second radio node-or the third radio node.

26. The first radio node of claim 14, wherein the sending circuit is further configured to send a request to the second radio node to send the information indicating frequency-domain resources associated with the guard band used or required in the radio spectrum used by the second radio node.

27. The method of claim 1, wherein the information indicating frequency-domain resources associated with the guard band comprises a geographical area where the guard band is applicable.

28. The first radio node of claim 14, wherein the information indicating frequency-domain resources associated with the guard band comprises a geographical area where the guard band is applicable.

* * * * *